(12) United States Patent
Asai et al.

(10) Patent No.: US 10,337,635 B2
(45) Date of Patent: Jul. 2, 2019

(54) SHAPE-MEMORY ALLOY VALVE DEVICE

(71) Applicant: TAKASAGO ELECTRIC, INC., Nagoya-shi, Aichi (JP)

(72) Inventors: Naoya Asai, Nagoya (JP); Hiroyuki Sugiura, Nagoya (JP)

(73) Assignee: TAKASAGO ELECTRIC, INC., Aichi-ken (JP)

( * ) Notice: Subject to any disclaimer, the term of this patent is extended or adjusted under 35 U.S.C. 154(b) by 0 days.

(21) Appl. No.: 15/849,480

(22) Filed: Dec. 20, 2017

(65) Prior Publication Data
US 2019/0003609 A1 Jan. 3, 2019

(30) Foreign Application Priority Data

Jun. 29, 2017 (JP) .................................. 2017-128057

(51) Int. Cl.
*F16K 31/00* (2006.01)
*F16K 37/00* (2006.01)
*F16K 7/16* (2006.01)

(52) U.S. Cl.
CPC .............. *F16K 31/002* (2013.01); *F16K 7/16* (2013.01); *F16K 37/0041* (2013.01)

(58) Field of Classification Search
CPC ....... F16K 31/002; F16K 7/16; F16K 37/0041
USPC ................................................... 251/129.06
See application file for complete search history.

(56) References Cited

U.S. PATENT DOCUMENTS

| | | | | |
|---|---|---|---|---|
| 3,725,835 A * | 4/1973 | Hopkins | ................ | G11B 21/12 337/140 |
| 4,579,006 A * | 4/1986 | Hosoda | .................... | F03G 7/06 374/142 |
| 7,503,444 B2 * | 3/2009 | Bohan | ..................... | F01P 7/042 123/41.12 |
| 2002/0113499 A1 * | 8/2002 | von Behrens | ........... | F03G 7/065 310/306 |
| 2004/0038120 A1 * | 2/2004 | Tsai | .................... | H01M 12/065 429/66 |
| 2007/0063540 A1 * | 3/2007 | Browne | .................. | B60R 21/38 296/180 |

(Continued)

FOREIGN PATENT DOCUMENTS

JP 4091035 B2 5/2008
WO WO-2015/173926 A1 11/2015

*Primary Examiner* — John Bastianelli
(74) *Attorney, Agent, or Firm* — Cheng Law Group, PLLC

(57) ABSTRACT

A shape-memory alloy valve device includes a shape-memory alloy wire configured to make a valve member perform an opening/closing operation and a valve actuation control unit configured to control an opening/closing operation of the valve member. The valve actuation control unit controls energization of the shape-memory alloy wire in accordance with an input valve open signal or an input valve close signal so as to make the shape-memory alloy wire contract by raising a temperature of the shape-memory alloy wire beyond an operating environmental temperature, thereby controlling valve opening/closing. A preheating unit heats the shape-memory alloy wire to a preset preheat set temperature by energizing the shape-memory alloy wire from a power circuit when the temperature of the shape-memory alloy wire which is measured by a temperature measurement unit is lower than the preheat set temperature.

10 Claims, 15 Drawing Sheets

(56) References Cited

U.S. PATENT DOCUMENTS

| | | | |
|---|---|---|---|
| 2008/0269639 A1* | 10/2008 | Korner | A61B 5/150022 600/583 |
| 2010/0199982 A1* | 8/2010 | Hansen | A61M 15/009 128/200.21 |
| 2010/0243077 A1* | 9/2010 | Grimseth | E21B 34/00 137/468 |
| 2017/0058881 A1 | 3/2017 | Sugiura et al. | |

* cited by examiner

PREHEATING CONTOROL DATA TABLE

| TEMPERATURE ts | ACTUATION VOLTAGE/CURRENT | | ACTUATION TIME | HOLDING VOLTAGE/CURRENT | |
|---|---|---|---|---|---|
| −20°C | 5.5V | 400mA | 0.3sec | 2.6V | 230mA |
| −15°C | 5.3V | 375mA | 0.26sec | 2.5V | 225mA |
| −10°C | 5.1V | 350mA | 0.22sec | 2.4V | 220mA |
| ⋮ | ⋮ | ⋮ | ⋮ | ⋮ | ⋮ |

SHAPE-MEMORY ALLOY VALVE DEVICE

BACKGROUND OF THE INVENTION

1. Field of the Invention

The present invention relates to a valve device that performs an opening/closing operation by using a shape-memory alloy wire and, more particularly, to a shape-memory alloy valve device that can improve the response speed of an opening/closing operation.

2. Description of Related Art

As a compact valve device used in various types of inspection apparatuses and analysis apparatuses, a shape-memory alloy valve device is known, as disclosed in, for example, Japanese Patent No. 4091035, which is provided with a shape-memory alloy wire that contracts by heat upon energization at the time of opening/closing of a valve so as to move a valving element with the contraction force of the shape-memory alloy valve device and make the valve open/close.

A shape-memory alloy valve device of this type uses no drive coil and hence can be significantly reduced in size as compared with conventional valve devices using drive coil type plungers. That is, a conventional valve device uses the magnetic attractive force generated by a drive coil to move the valving element, and hence the wire diameter, number of turns, and current value of the drive coil need to be increased to some extent. This makes it difficult for the valve device to achieve downsizing.

In contrast to this, a shape-memory alloy valve device designed to make a valving element open/close with the heat contraction force of a shape-memory alloy wire can make a valving element open/close by only using a thin linear shape-memory alloy wire in place of a drive coil. This makes it possible to achieve a large reduction in the size of the valve device.

However, valve opening/closing driving of the shape-memory alloy valve device is performed by using heat contraction of the shape-memory alloy wire at the time of energization. A rise in the temperature of the wire at the time of energization depends on the amount of Joule heat generated due to the resistance of the shape-memory alloy and the heat conductivity of the alloy. In addition, a rise in the temperature of the wire is significantly influenced by the temperature of the shape-memory alloy wire itself which has lowered to the environmental temperature at the time of startup of the valve device.

Assume that when the power circuit of the shape-memory alloy valve device starts up, for example, the temperature in a room where the valve device is used is low, and the temperature of the shape-memory alloy wire itself is low. In this case, although inputting a valve open signal or valve close signal will start to energize the shape-memory alloy wire, it takes a considerable amount of time to raise the wire temperature to a contraction temperature and make the valve open/close. When the response speed of opening/closing operation of the valve device is low and the device is in a low-temperature environment, there is a problem that the temperature of the shape-memory alloy wire cannot be raised to an operating temperature, resulting in failure to perform a valve operation.

SUMMARY OF THE INVENTION

It is an object of the present invention to provide a shape-memory alloy valve device that can improve the response speed when a shape-memory alloy wire is energized to open or close the valve. The object of the present invention can be achieved by a shape-memory alloy valve device having the following arrangement.

That is, a shape-memory alloy valve device according to the present invention includes a valve member and a shape-memory alloy wire configured to make the valve member perform an opening/closing operation. The shape-memory alloy valve device is configured to make the shape-memory alloy wire contract by energizing and heating it so as to make the valve member perform an opening/closing operation. The shape-memory alloy valve device is characterized by including a temperature measurement unit configured to measure the temperature of the shape-memory alloy wire, a preheating unit configured to raise the temperature of the shape-memory alloy wire to a predetermined set preheat temperature by energizing the shape-memory alloy wire from a power circuit when the temperature of the shape-memory alloy wire which is measured by the temperature measurement unit is lower than the set preheat temperature, and a valve actuation control unit configured to control energization of the shape-memory alloy wire in accordance with an input valve open signal or input valve close signal to raise the temperature of the shape-memory alloy wire beyond an operating environmental temperature so as to make the shape-memory alloy wire contract and make the valve member perform an opening/closing operation.

Note that the valve member described above is a concept including not only a valve member having a structure configured to move a valving element such as a diaphragm valve to and from a valve seat by making a shape-memory alloy wire contract so as to make the valve open/close but also a valve member having a structure configured to press the valve member against a tube internally provided with a fluid path so as to collapse the tube and close the valve.

A shape-memory alloy wire used for a shape-memory alloy valve device is heated to a valve actuation temperature higher than an environmental temperature by energization. As a consequence, the wire contracts to perform a valve opening or closing operation. When, for example, this operation is performed at an operating environmental temperature equal to room temperature, the valve actuation temperature is considerably higher than room temperature. At the startup of the power circuit, because the temperature of the shape-memory alloy wire is usually lower than room temperature, when room temperature is low, it takes much time to reach the valve actuation temperature, resulting in low response speed of the valve device.

According to the present invention, when the temperature of a shape-memory alloy wire which is measured by a temperature measurement unit is lower than a preset preheat temperature at the startup of a power circuit, a preheating unit heats the shape-memory alloy wire to the preheat temperature by energization. For this reason, while the power circuit is ON, the preheating unit preheats the shape-memory alloy wire, and a valve actuation control unit inputs a valve open signal or valve close signal in the preheated state and heats the temperature of the shape-memory alloy wire to a valve actuation temperature by energization. This significantly improves the response speed of the valve device, and hence allows the valve device to perform an opening/closing operation at a high response speed from the beginning of operation of the valve device.

In this case, the above temperature measurement unit can include a temperature calculation unit that detects a voltage of the shape-memory alloy wire at predetermined time intervals at the time of energization of the shape-memory alloy wire, calculates a resistance value from the voltage, and calculates the temperature of the shape-memory alloy wire from the resistance value.

It is also possible to measure the temperature of the shape-memory alloy wire at the time of preheating on the basis of a detection signal from a temperature sensor as the above temperature measurement unit disposed near the shape-memory alloy wire.

The power circuit is provided with a constant current source, and the above valve actuation control unit can be configured to control the current value of the shape-memory alloy wire by converting a current supplied from the constant current source into pulses by switching at a predetermined frequency and changing the duty ratio (pulse width) of the pulses.

As described above, the shape-memory alloy valve device according to the present invention can improve the response speed at the time of valve actuation because a valve opening or closing operation is performed by making the shape-memory alloy wire contract by energization while the shape-memory alloy wire is preheated.

BRIEF DESCRIPTION OF THE DRAWINGS

FIG. 18 is a sectional view of a shape-memory alloy valve device according to the fourth embodiment;

DESCRIPTION OF THE PREFERRED EMBODIMENTS

Figure 1:
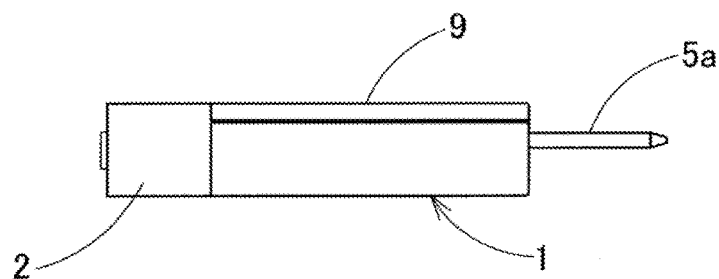
FIG. 1 is a front view of a shape-memory alloy valve device according to the first embodiment of the present invention.
Figure 2:
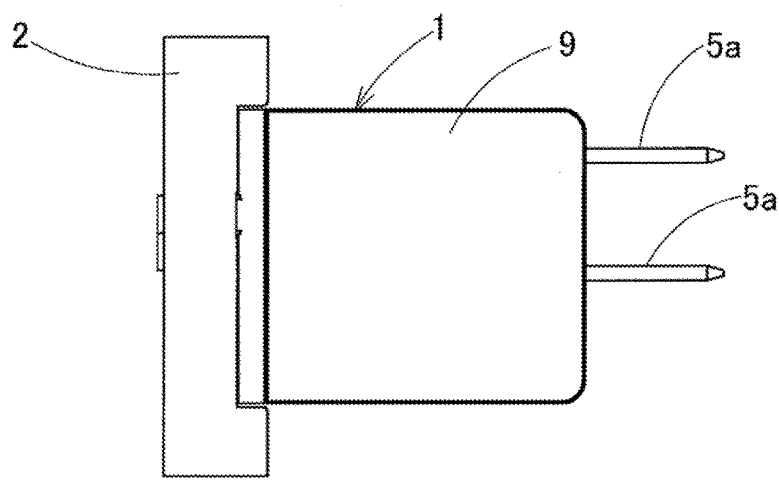
FIG. 2 is a plan view of the shape-memory alloy valve device.
Figure 3:
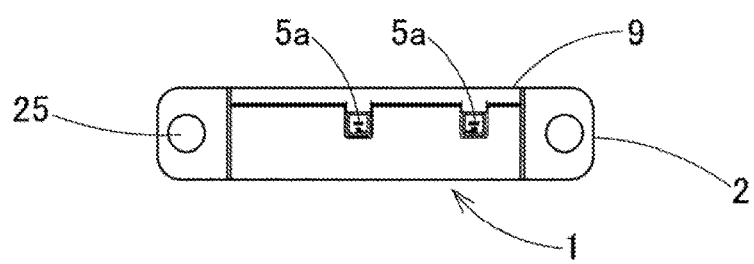
FIG. 3 is a right side view of the shape-memory alloy valve device.
Figure 4:
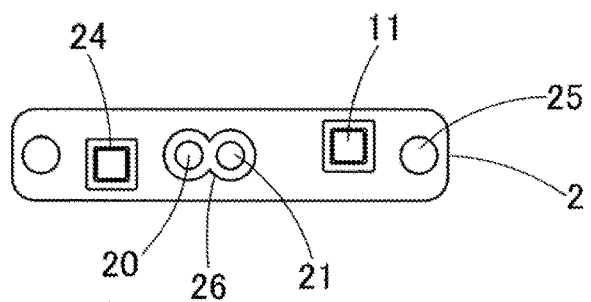
FIG. 4 is a left side view of the shape-memory alloy valve device.
Figure 5:
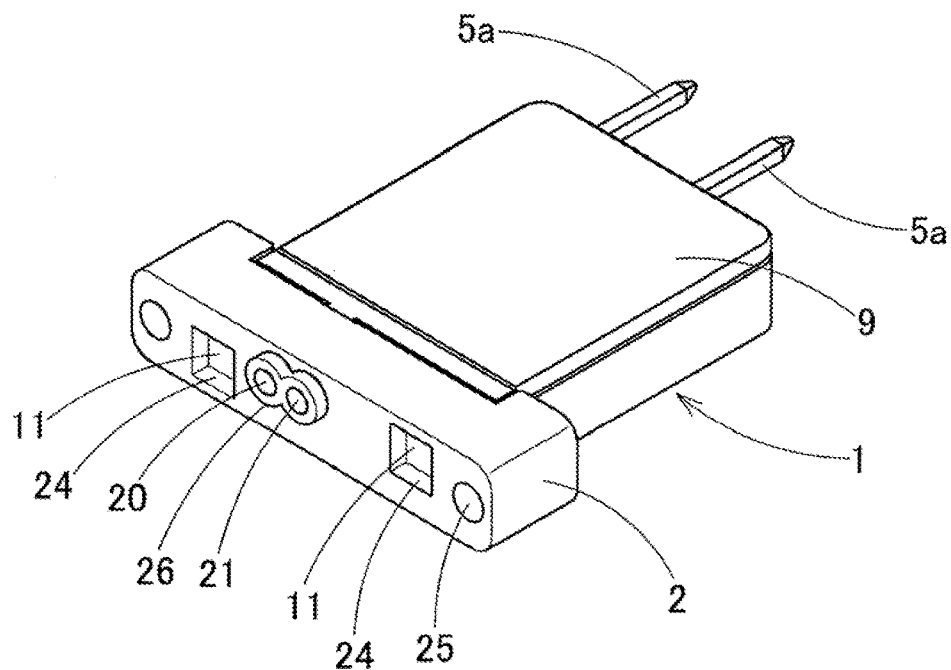
FIG. 5 is a perspective view of the shape-memory alloy valve device.
Figure 6:
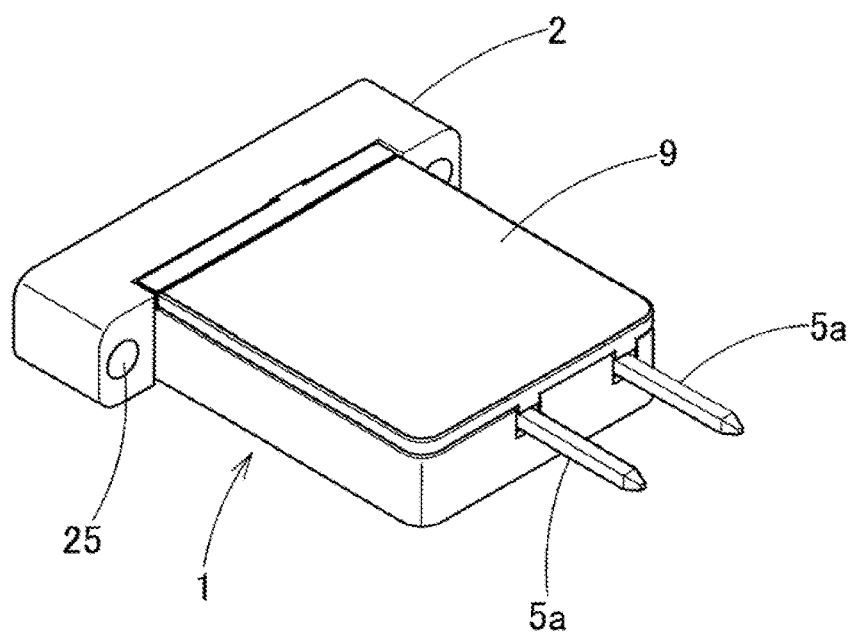
FIG. 6 is a perspective view of the shape-memory alloy valve device when viewed from the right side.

The present invention will be described below with reference to the embodiments illustrated in the accompanying drawings. Note that the present invention is not limited to the embodiments. Any changes within claim requirements or equivalents concerning the requirements are included in the scope of claims.

FIGS. 1 to 12 show a shape-memory alloy valve device according to the first embodiment. This shape-memory alloy valve device is a compact valve device used for cell culture apparatuses, blood test apparatuses, various types of analysis apparatuses, and the like. As shown FIGS. 7 and 8, the shape-memory alloy valve device roughly includes a main body case 1 internally provided with a storage room 10, a plunger 3 slidably disposed in the storage room 10, a diaphragm valve 8 serving as a valve member connected to an end portion of the plunger 3, a base portion 2 fitted on the base of the main body case 1, a cover 9 that covers the open upper surface of the main body case 1, and a shape-memory alloy wire 7 that makes the plunger 3 slide in the storage room.

The shape-memory alloy valve device is further provided with a spring member 4 that is attached to the plunger 3 to bias the plunger 3 in a valve opening direction, a valve chamber 22 provided for the diaphragm valve 8 connected to the distal end of the plunger 3 on the opposite side to the plunger, a valve seat portion 23 which is provided in the valve chamber 22 and on which the diaphragm valve 6 is seated, and first and second ports 20 and 21 provided to be communicative with the valve chamber 22.

The diaphragm valve 6 as a valve member is an example. As will be described later, various types of valve members can be used in accordance with the forms of valve devices such as a direction switching type valve device, bellows type valve device, spool type valve device, slide type valve device, gate type valve device, and pinch valve device.

Figure 7:
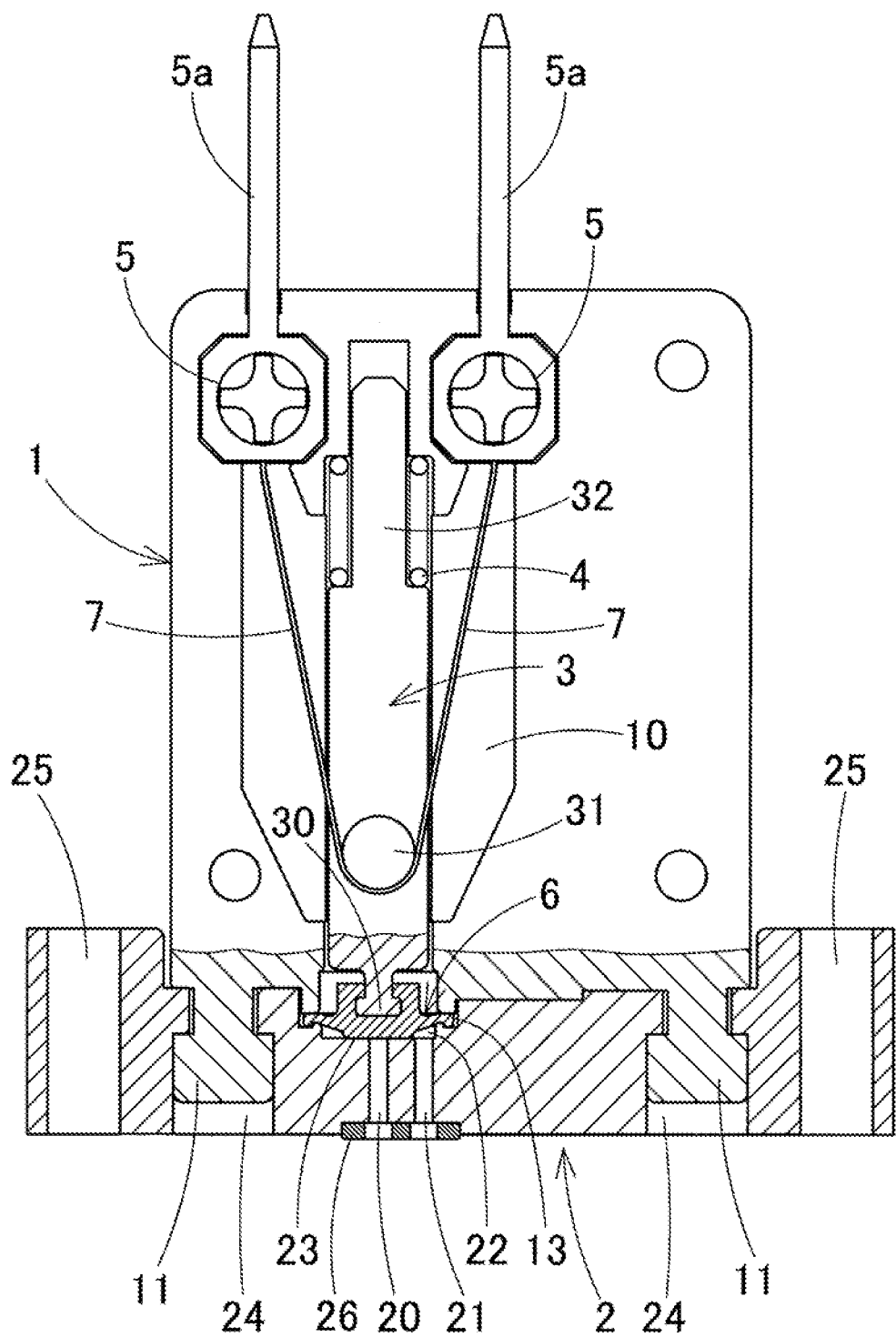
FIG. 7 is a partially sectional view of the shape-memory alloy valve device.
Figure 8:
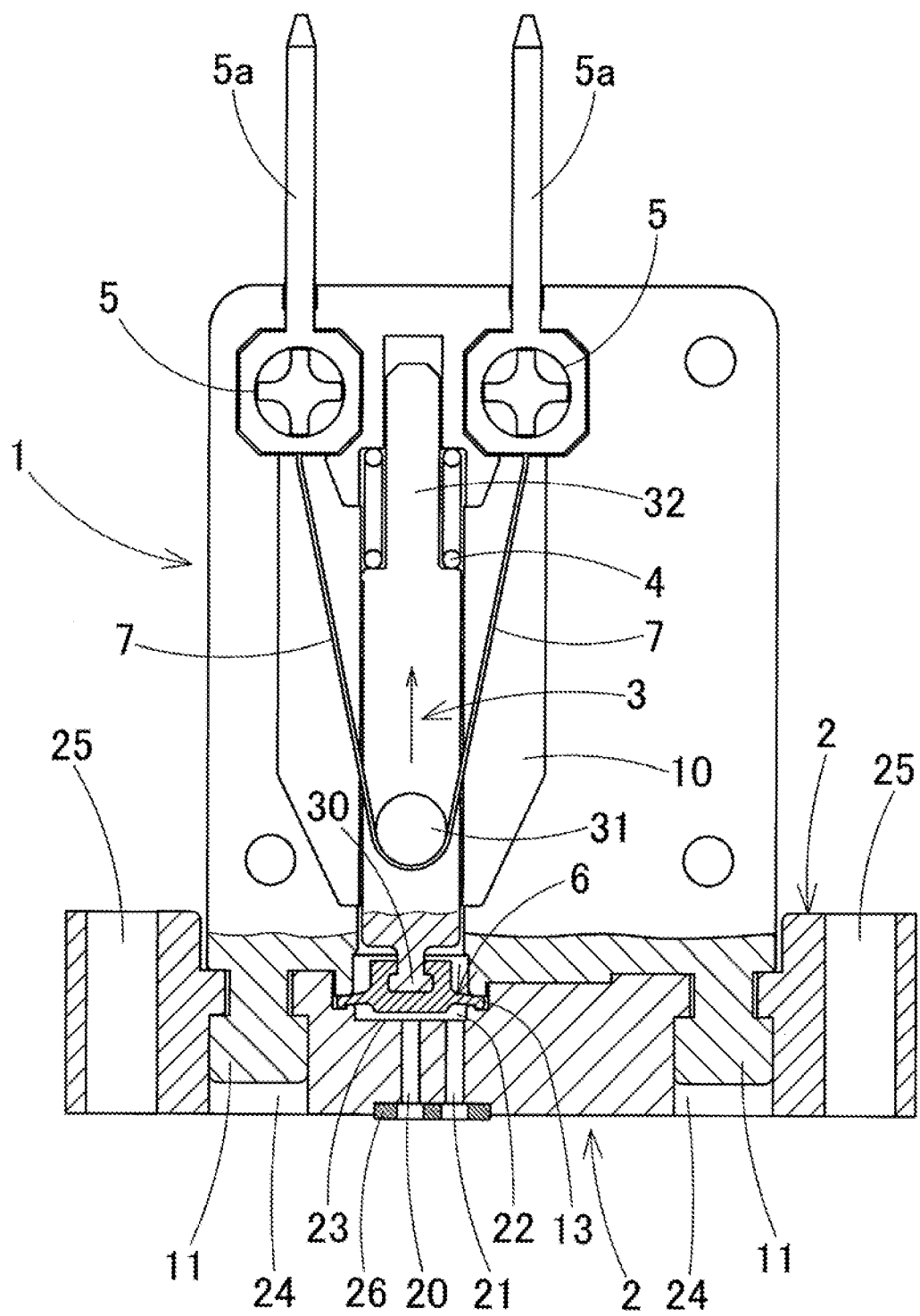
FIG. 8 is a partially sectional view of the shape-memory alloy valve device at the time of energization/actuation.

As shown in FIGS. 7 and 8, the storage room 10 provided in the main body case 1 is provided with a portion that holds the plunger 3 so as to make it slidable in the axial direction and a portion that holds the spring member 4, and the plunger 3 is held at a predetermined position in the storage room 10 so as to be slidable by a predetermined stroke. In addition, the inside of the main body case 1 is provided with fitting holes in which fitting pins of the cover 9 are fitted. A fitting hole is formed in the base of the main body case 1, and rectangular fitting convex portions 11 protrude from the base. The fitting hole and the fitting convex portions 11 are used to fit the base portion 2 to the base of the main body case 1.

As shown in FIG. 7, an opening 13 corresponding to the diaphragm valve 6 is formed in that side wall portion of the main body case 1 which is located on the base portion 2 side. The peripheral edge portion of the diaphragm valve 6 is fitted in the opening 13 from the outside. A valve connecting portion 30 on the distal end of the plunger 3 is fitted and fixed in that middle portion of the diaphragm valve 6 which is offset to the left. In addition, as shown in FIG. 7, rectangular fitting holes 24 are formed in the base portion 2 in conformity with the fitting convex portions 11 on the main body case. The fitting convex portions 11 are fitted in the fitting holes 24 to fit the base portion 2 to the base of the main body case 1 at a predetermined position.

As shown in FIG. 8, the valve chamber 22 is provided in the base portion 2 by forming an opening in its outside portion, and the base portion 2 is fitted to a side wall portion of the base of the main body case 1, thereby fitting the diaphragm valve 6, attached to the main body case 1, to the base portion 2 so as to cover the outside of the valve chamber 22. As shown in FIGS. 7 and 8, the first port 20 is provided in the base portion 2 on the opposite side of the valve chamber 22, formed in the base portion 2, to the diaphragm so as to communicate with the valve chamber 22, and the valve seat portion 23 is formed on the peripheral edge portion that communicates with the first port 20. With this structure, at the time of valve closing, the diaphragm valve 6 is seated on the valve seat portion 23 upon sliding of the plunger 3, thereby closing the first port 20.

As shown in FIG. 7, the base portion 2 is also provided with the second port 21 communicating with the valve chamber 22. A spectacle-shaped seal member 26 is fitted on the outsides of the first and second ports 20 and 21, to which a fluid supply port and a fluid input port (which are not shown) are connected. Note that two doughnut-shaped O-rings can be used in place of the seal member 26. In addition, fixing holes 25 are formed in the two end portions of the base portion 2 to fix this shape-memory alloy valve device to an inspection apparatus, analysis apparatus, or the like.

As shown in FIG. 7, a wire hooking portion 31 is provided on a side portion of that middle portion of the plunger 3 which is offset to the distal end. The shape-memory alloy wire 7 is hooked in a substantially U-shape on the wire hooking portion 31. The wire hooking portion 31 is formed from a metal in the form of a roller or cylindrical column. The wire hooking portion 31 is fitted and held in a shaft portion protruding from a side portion of the plunger 3. That portion of the plunger 3 which is located on the opposite side to the valve connecting portion is formed as a small-diameter portion 32. The spring member 4 in the form of a coil spring is fitted on the small-diameter portion 32. As shown in FIG. 7, in a usual state, the spring member 4 is mounted between the plunger 3 and the main body case 1 so as to bias the plunger 3 toward the valve closing side (the side where the diaphragm valve 6 is pressed against the valve seat portion 23).

This implements the shape-memory alloy valve device according to this embodiment as a normal close type valve device, which is configured to close the valve in a usual state (unbiased state), as shown in FIG. 7. In contrast to this, the shape-memory alloy valve device can also be implemented as a normal open type valve device. In this case, the valve device may be structured such that the spring member biases the plunger toward the valve opening side (the side where the diaphragm valve is separated from the valve seat) in a usual state (unbiased state), and the plunger is moved by contraction of the shape-memory alloy wire at the time of valve actuation to seat the diaphragm valve on the valve seat so as to close the valve.

The shape-memory alloy wire 7 is hooked on the wire hooking portion 31, with the middle portion of the shape-memory alloy wire 7 being bent in a substantially U-shape. Terminal members 5 are connected to the two end portions of the shape-memory alloy wire 7 and held. As shown in FIG. 7, one pair of terminal members 5 are fitted and fixed in holding chambers provided in the main body case 1. Connector terminals 5a each formed from a conductive metal are attached to the terminal members 5, and the two end portions of the shape-memory alloy wire 7 are electrically connected to the connectors 5a.

The connectors 5a of the terminal members 5 in an attached state protrude from the main body case 1 toward the opposite side to the base. This allows female connectors (not shown) to be easily connected to the connectors 5a at the time of using the valve device, thus allowing the use of the compact valve device by easily attaching and connecting it to an inspection apparatus, analysis apparatus, or the like. Note that lead wires connected to the shape-memory alloy wire 7 may be extracted from the main body case 1 instead of using the connector terminals 5a.

Figure 9:
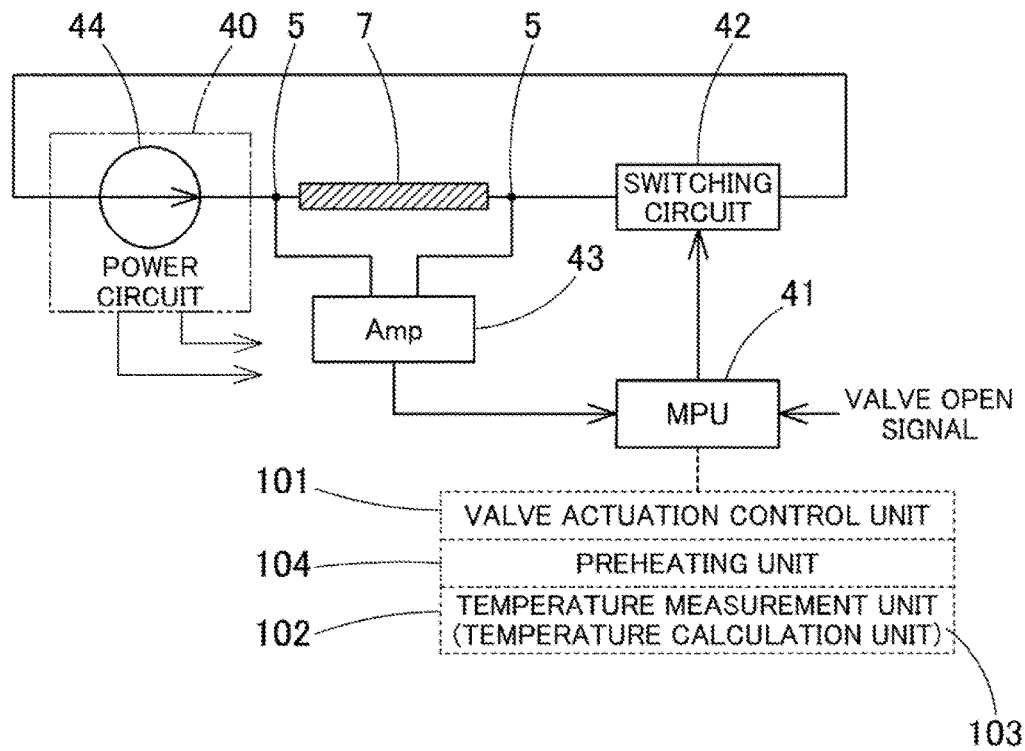
FIG. 9 is a block diagram showing the arrangement of a control circuit.

A control drive circuit shown in FIG. 9 drives/controls the shape-memory alloy valve device having the above arrangement to perform a valve opening/closing operation. As shown in FIG. 9, the control drive circuit of the valve device includes, for example, a microcomputer 41 such as a single-chip computer as a main component, and is connected to the device so as to supply a pulse current whose duty ratio or pulse width is controlled from a constant current source 44 to the shape-memory alloy wire 7.

A valve actuation control unit 101, a temperature measurement unit 102, a temperature calculation unit 103, and a preheating unit 104, which are described above, each are mainly formed from processing executed by software in the microcomputer 41. The microcomputer 41 stores, in advance, software for executing temperature measurement processing and current control for the shape-memory alloy wire, as shown in FIG. 9

The valve actuation control unit 101 performs control to energize the shape-memory alloy wire 7 in accordance with an input valve open signal or input valve close signal and stops energizing the shape-memory alloy wire 7 when the temperature of the shape-memory alloy wire 7, measured by the temperature measurement unit 102, reaches a preset valve actuation temperature. The valve actuation control unit 101 also performs control to resume energizing the shape-memory alloy wire 7 to hold the temperature of the shape-memory alloy wire 7 at a valve holding temperature when the measured temperature decreases to the valve holding temperature lower than the valve actuation temperature. In addition, when a valve close signal is input to the microcomputer 41, the valve actuation control unit 101 performs control to stop energizing the shape-memory alloy wire 7, and controls energization of the shape-memory alloy wire 7 on the basis of the temperature calculated from the voltage of the shape-memory alloy wire 7, thereby controlling a valve opening/closing operation.

The preheating unit 104 is configured to resume energizing from a power circuit 40 to the shape-memory alloy wire 7, when the temperature of the shape-memory alloy wire decreases below the preset preheat set temperature, so as to heat the wire to the preheat set temperature.

The temperature measurement unit 102 includes the temperature calculation unit 103 that detects a voltage across the two ends of the shape-memory alloy wire 7 at the time of energizing the shape-memory alloy wire 7, calculates a resistance value from the voltage, and calculates the temperature of the shape-memory alloy wire 7 from the resistance value. The temperature measurement unit 102 detects a voltage across the two ends of the shape-memory alloy wire 7, amplifies the voltage detection signal by using an amplifier 43, and inputs the signal to the microcomputer 41. The temperature calculation unit 103 formed from the microcomputer 41 calculates the resistance value of the shape-memory alloy wire 7 from the input voltage signal, and calculates the temperature of the shape-memory alloy wire 7 from the resistance value.

The power circuit 40 supplies power to the microcomputer 41, a switching circuit 42, and the like, and includes the constant current source 44 that supplies a constant current to the shape-memory alloy wire 7 via the terminal members 5, as shown in FIG. 9.

As shown in FIG. 9, the constant current source 44 is connected to the shape-memory alloy wire 7 to supply a pulse current to it in accordance with the operation of the switching circuit 42. The switching circuit 42 is subjected to switching control on the basis of a control signal output from the microcomputer 41 so as to control the duty ratio (pulse width) of a pulse current energizing the shape-memory alloy wire 7, thereby executing PWM control on current values supplied to the shape-memory alloy wire 7 at the time of opening/closing the valve and at the time of preheating the wire.

Figure 12:
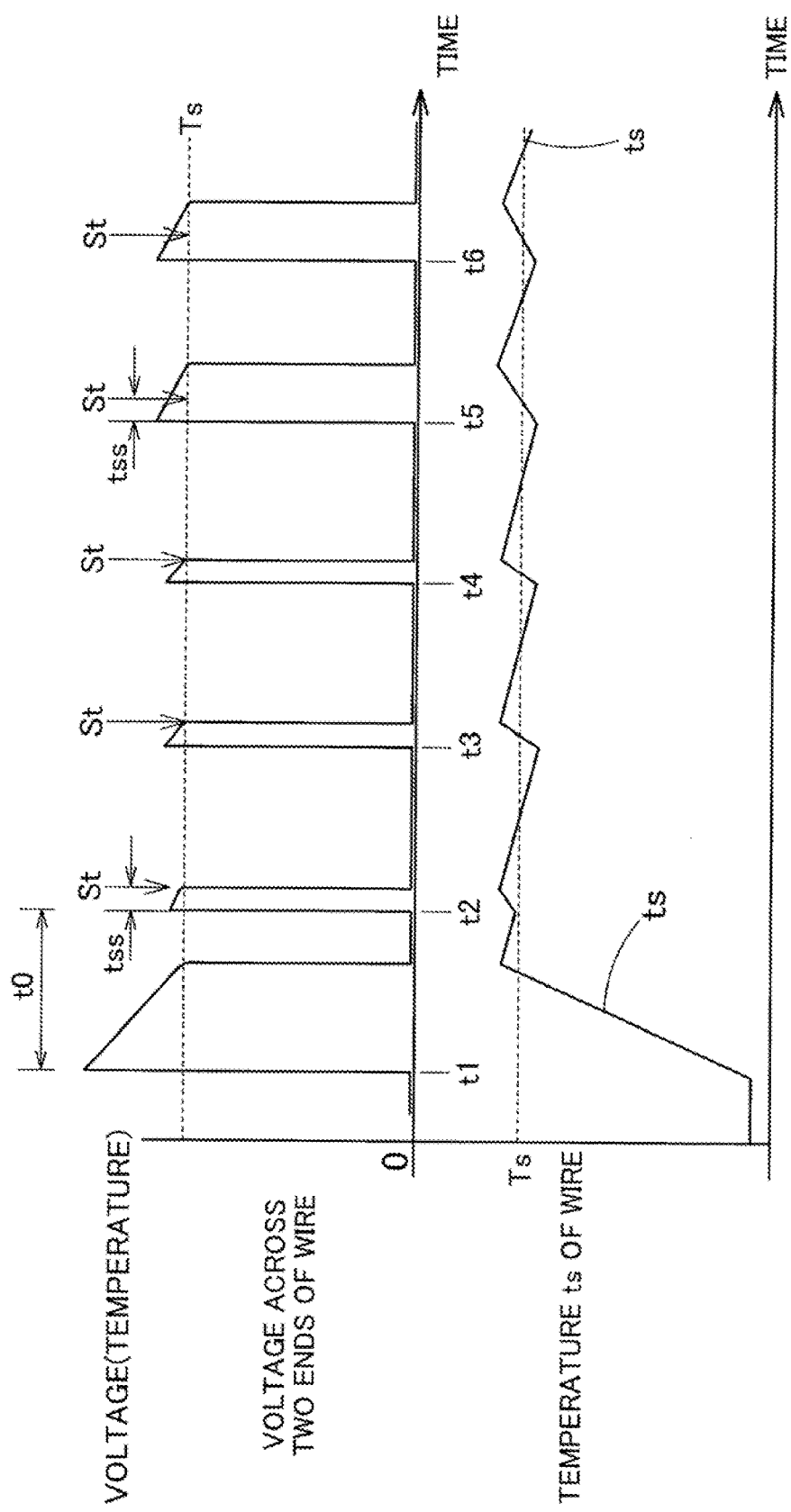
FIG. 12 is a graph for explaining a voltage waveform and a temperature change at the time of preheating control.

At the time of preheating, when a pulse current is supplied under PWM control, a pulse voltage waveform rises at pulse leading edge timings t1, t2, t3, . . . , as shown in FIG. 12. A pulse is generated with period t0. At the time of the first pulse current supply, a pulse voltage gradually decreases from a high voltage with a reduction in resistance value accompanying a wire temperature rise. As shown in FIG. 12, temperature (voltage) measurement timing St is set at a short time tss after each of leading edge timings t1, t2, t3 . . . with period t0.

A preset preheat set temperature (voltage) Ts is set at a voltage level Ts in FIG. 12. PWM control is executed on a current to the shape-memory alloy wire 7 to preheat the wire such that when the voltage at temperature (voltage) measurement timing St is lower than the preheat set temperature (voltage) Ts, the shape-memory alloy wire 7 is energized until its voltage reaches the preheat set temperature (voltage) Ts, whereas when the voltage reaches the voltage level Ts, energization of the shape-memory alloy wire 7 is turned off.

Note that this embodiment performs PWM control (pulse width control) as a method of controlling a current value of the shape-memory alloy wire 7. However, it is also possible to control the current value of the shape-memory alloy wire 7 by using a current adjustment circuit connected to the constant current source.

Next, preheating control on the shape-memory alloy valve device and a valve opening/closing operation will be described with reference to the schematic flowchart of FIG. 11 and the voltage waveform/temperature change graph of FIG. 12. When the power circuit 40 of the valve device is turned on, the microcomputer 41 and the switching circuit 42 operate to supply a pulse current to the shape-memory alloy wire 7. A pulse voltage waveform similar to the voltage shown in FIG. 12 then appears across the two ends of the wire to raise the temperature of the wire, thus starting to preheat the shape-memory alloy wire 7.

At the time of preheating, PWM control (pulse width control) is executed on a current value in accordance with a temperature ts of the shape-memory alloy wire 7, and a pulse voltage generated across the two ends of the shape-memory alloy wire 7 acts to raise the temperature ts of the wire, when the temperature ts of the wire is lower than a preset preheat set temperature Ts, by increasing a pulse width (increasing an energization period) until the temperature ts reaches the preheat set temperature Ts (for example, 54° C.), as shown in FIG. 12. That is, as indicated by steps 200 and 210 schematically shown in FIG. 11, steps 200 and 210 are repeated to perform preheating control on the shape-memory alloy wire 7.

At the time of preheating, as shown in FIG. 12, the pulse period of a pulse current is set to t0 (for example, several ten m sec), and a pulse voltage (current) in each period rises at times t1, t2, t3 . . . . At the time of the first pulse current supply, a pulse voltage gradually decreases from a high voltage with a reduction in resistance value accompanying a wire temperature rise. Temperature measurement timing St is set at the predetermined short time tss after each of pulse leading edge times t1, t2, t3, . . . . A voltage detection signal concerning the shape-memory alloy wire 7 is input to the microcomputer 41 at temperature measurement timing St in each pulse period, and the temperature is of the wire is calculated from the voltage signal in each pulse period.

The microcomputer 41 repeatedly and consecutively calculates the temperature ts in a short time. When the calculated temperature ts of the shape-memory alloy wire 7 is lower than the preset preheat set temperature Ts, energization of the shape-memory alloy wire 7 is continued, whereas when the temperature ts of the wire reaches the preheat set temperature Ts, energization in the corresponding pulse period is turned off, as shown in FIG. 12. In contrast to this, when the temperature ts of the wire is higher than preheat set temperature Ts, energization is immediately turned off. With this operation, as shown in FIG. 12, the pulse width of a current to the shape-memory alloy wire 7 is controlled to control a current value, thereby maintaining the temperature ts of the wire at the preset preheat set temperature Ts.

Figure 10:
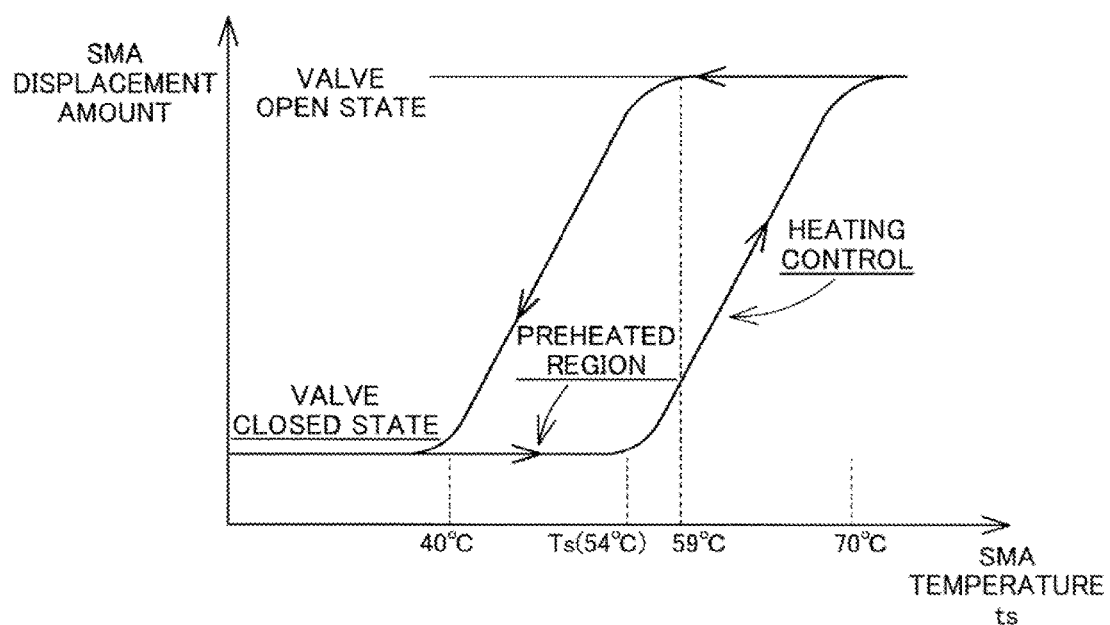
FIG. 10 is a graph showing the relationship between the temperature of a shape-memory alloy wire and its expansion/contraction amount.

The graph of FIG. 10 indicates the relationship between the displacement amount (expansion/contraction amount) of the wire and temperature in a preheated region of the shape-memory alloy wire 7 at the time of valve opening/closing. As is obvious from FIG. 10, the shape-memory alloy valve device performs preheating control on the wire in a valve closed state while performing a valve opening/closing operation accompanied by hysteresis. At this time, the preheat set temperature Ts is set to, for example, 40° C., to which the temperature of the shape-memory alloy wire 7 returns with hysteresis after a valve opening/closing operation.

As described above, at the time of preheating, a pulse current to the wire is controlled by PWM control (pulse width control) in accordance with the temperature ts of the shape-memory alloy wire 7. With this control, steps 200 and 210 in FIG. 11 are repeated to maintain the temperature ts of the shape-memory alloy wire 7 at the preset preheat set temperature Ts.

Assume that an environmental temperature (room temperature) in a place where the valve device is placed is, for example, as low as 10° C. and the temperature of the wire is also low. In this case, with the above operation, even when the valve device immediately performs a valve opening/closing operation, it is possible to perform a valve opening/closing operation at a very high response speed because a pulse current is supplied to the shape-memory alloy wire 7 to quickly raise the temperature ts of the wire to the preheat set temperature Ts at the same time when the power circuit 40 of the valve device is activated.

That is, in brief, the microcomputer 41 applies a pulse signal with a duty ratio for preheating to the switching circuit 42 in step 210 to perform switching drive, and supplies a pulse current for preheating to the shape-memory alloy wire 7, thereby heating the shape-memory alloy wire 7 upon application of the pulse current for preheating. As a consequence, the temperature ts of the wire reaches the preheat set temperature Ts.

In this manner, the shape-memory alloy valve device repeats steps 210 and 220 in a preheated state, and applies a pulse current for preheating to the shape-memory alloy wire 7 to continue preheating the shape-memory alloy wire 7. If the temperature ts of the shape-memory alloy wire 7 at this time is, for example, less than 54° C., the wire does not contract, and the plunger 3 does not slide. A preheated state can be set by heating the wire to 54° C., which is a nonoperating temperature of the valve.

When a valve open signal (valve ON signal) is input to the microcomputer 41 in a preheated state, the process advances from step 230 to step 240, in which the microcomputer 41 controls the switching circuit 42 to supply a pulse current with a high duty ratio to the shape-memory alloy wire 7.

This quickly raises the temperature ts of the shape-memory alloy wire 7 to 54° C. or more, and heating control is performed until the temperature of the wire reaches 70° C., which is a valve actuation temperature. As a consequence, the shape-memory alloy wire 7 contracts. As shown in FIG. 8, this causes the plunger 3 to slide upward in FIG. 8 against the biasing force of the spring member 4, and the diaphragm valve 6 connected to the lower end of the plunger 3 separates from the valve seat portion 23 to perform a valve opening operation, thereby causing the valve device to open the valve.

As described above, as shown in FIG. 10, the temperature ts of the shape-memory alloy wire 7 is preheated to near 54° C. (nonoperating temperature) by preheating at the time of inputting a valve open signal. For this reason, when a valve open signal is input, the temperature of the wire can be quickly raised to 70° C., which is a valve actuation temperature. This can improve the response speed of the opening/closing operation of the valve device.

The above open valve state continues while the shape-memory alloy wire 7 holds its contraction state. The contraction state of the shape-memory alloy wire 7 is maintained even when the temperature ts of the shape-memory alloy wire 7 decreases from, for example, 70° C., which is a valve actuation temperature, to, for example, 59° C., which is a valve holding temperature. When a valve closing operation is to be performed upon reception of a valve close signal, the shape-memory alloy wire 7 is made to expand by being naturally cooled. In order to increase the responsiveness of valve closing upon reception of the next valve close signal, the temperature of the wire is preferably maintained at a possibly low open valve holding temperature.

For this reason, in steps 240 to 260, the microcomputer 41 controls the duty ratio of a pulse current and controls a current value so as to lower the temperature ts of the shape-memory alloy wire 7 from 70° C. to 59° C., which is a valve holding temperature. When a valve close signal is input, the process advances from step 270 to step 280, in which the microcomputer 41 controls the switching circuit 42 to turn off a pulse current to stop heating the shape-memory alloy wire 7 by energization, thus starting a natural cooling process.

As shown in FIG. 10, this lowers the temperature ts of the shape-memory alloy wire 7 to, for example, less than 40° C. This causes the shape-memory alloy wire 7 to expand to a length before contraction. The plunger 3 then returns, and the diaphragm valve 6 is seated on the valve seat portion 23, thereby causing the valve to return to a valve closed state. Thereafter, the valve device returns to the preheated state again, and steps 200 to 220 are executed to perform preheating control on the shape-memory alloy wire 7 in the above manner until a valve open signal is input, thereby maintaining the shape-memory alloy wire 7 at the preheat set temperature Ts.

As described above, in the shape-memory alloy valve device, while the power circuit 40 is in an ON state, when the temperature ts of the shape-memory alloy wire 7, measured by the temperature measurement unit 102, is lower than the preset preheat temperature, the preheating unit 104 heats the shape-memory alloy wire 7 to the preheat temperature by energizing the wire. For this reason, while the shape-memory alloy wire 7 is preheated, the valve actuation control unit 101 receives a valve open signal or valve close signal and heats the shape-memory alloy wire 7 to a valve actuation temperature by energizing the valve. This significantly improves the response speed of the valve device. The valve device can therefore perform an opening/closing operation at a high response speed from the beginning of startup.

Note that the above embodiment has exemplified the valve opening/closing operation of the normal close type shape-memory alloy valve device. However, this valve device can be applied to a normal open type shape-memory alloy valve device. A preheating control operation for a normal open type shape-memory alloy valve device is basically the same as that for the above device except that a valve open state is replaced with a valve closed state and a valve open signal and valve close signal are respectively replaced with a valve close signal and a valve open signal.

Figure 13:
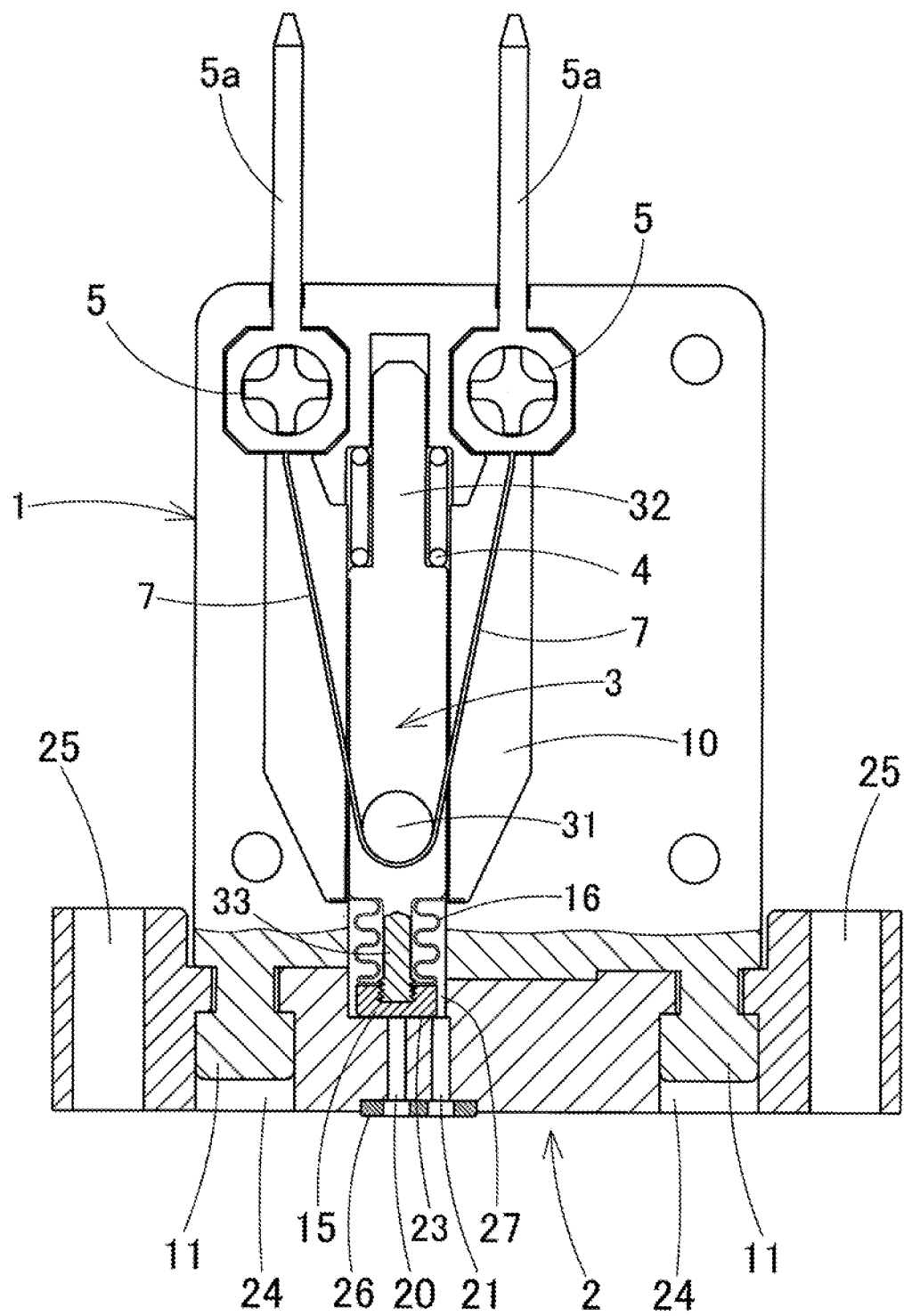
FIG. 13 is a sectional view of a shape-memory alloy valve device according to the second embodiment.

FIG. 13 shows a shape-memory alloy valve device according to the second embodiment. This shape-memory alloy valve device is formed as a bellows type valve device. The same reference numerals as in FIG. 13 denote the same components in the above embodiment, and a description of the components will be omitted. This bellows type valve device has a valve member 15 fixed to the distal end of a valve connecting portion 33 in place of the diaphragm valve 6 described above. When a plunger 3 is located at a descent position due to the biasing force of a spring member 4, the valve member 15 is seated on a valve seat portion 23 to close the valve. When a shape-memory alloy wire 7 is made to contract by energization, the valve member 15 moves upward to open the valve. A bellows 16 is attached to a lower portion of the plunger 3 so as to cover the valve member 15 and the valve connecting portion 33, and an upper edge portion of the bellows 16 is fixed to the inside of main body case 1. A valve chamber 27 can be opened/closed relative to a first port 20 as the bellows 16 and the valve member 15 move up and down.

Figure 14:
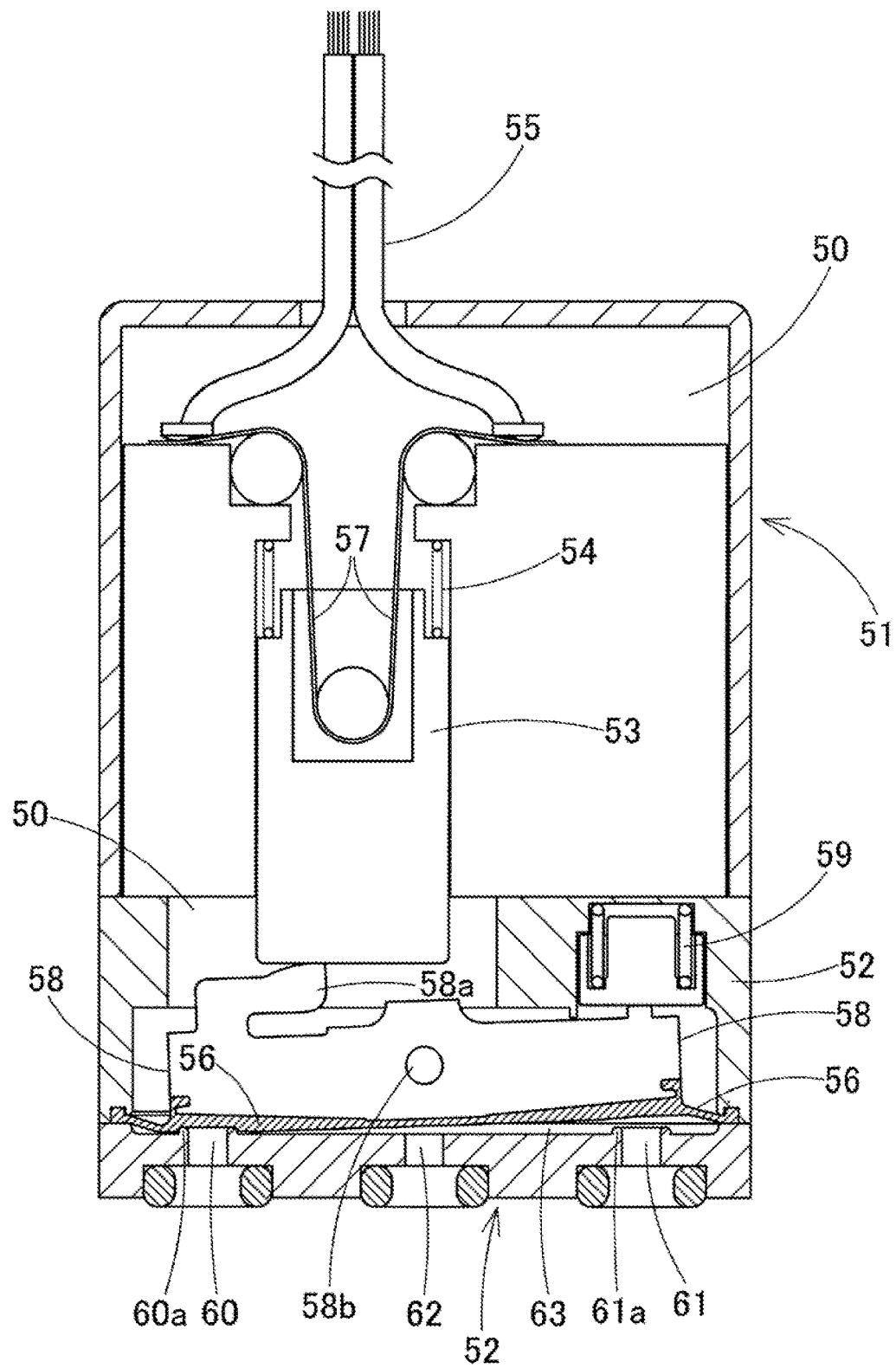
FIG. 14 is a sectional view of a shape-memory alloy valve device according to the third embodiment.
Figure 15:
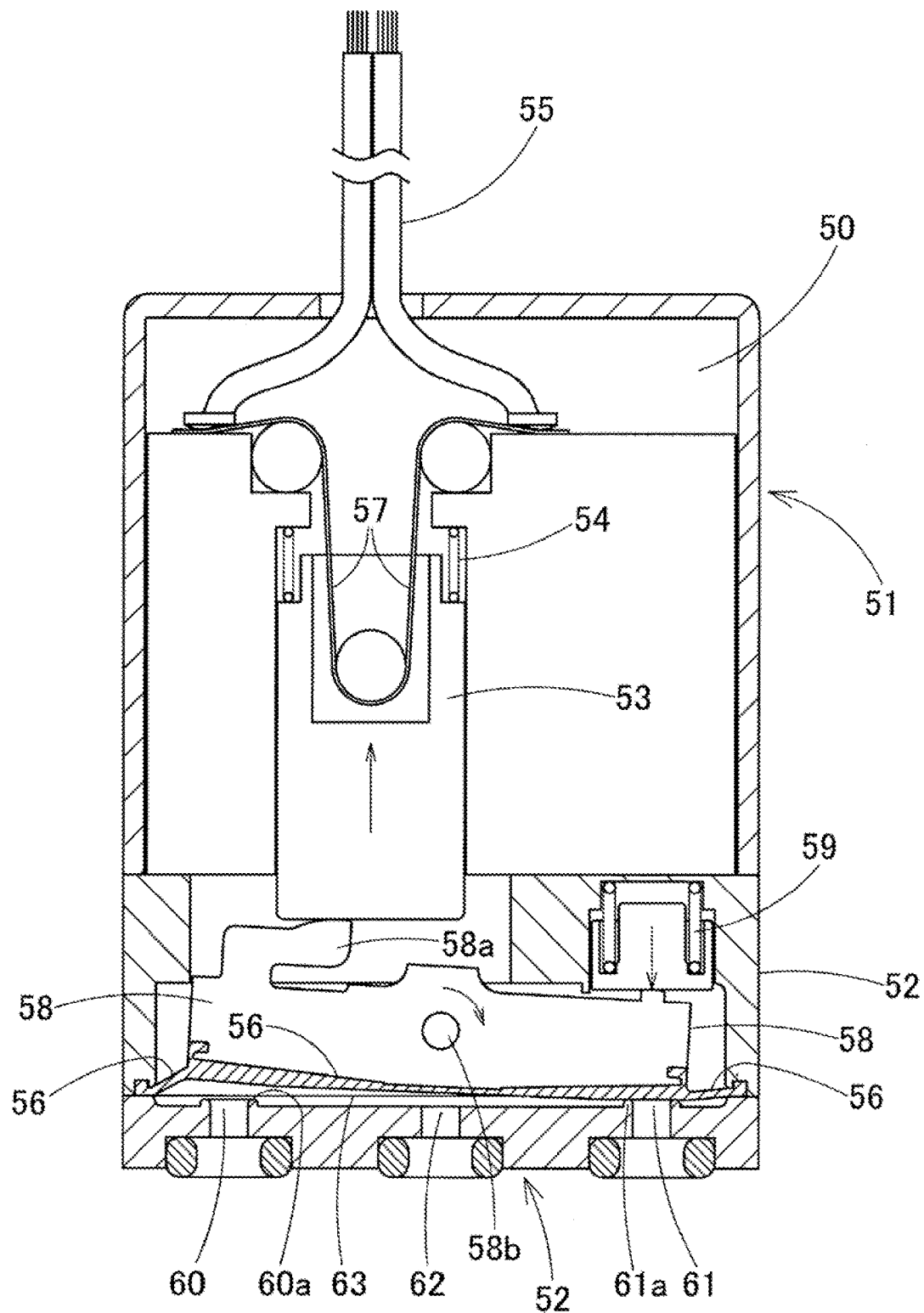
FIG. 15 is a sectional view of the shape-memory alloy valve device at the time of energization/actuation.

FIGS. 14 and 15 show a shape-memory alloy valve device according to the third embodiment, which is configured to make a three-way switching valve perform a switching operation by using a shape-memory alloy wire 57. As shown in FIG. 14, the shape-memory alloy valve device for this three-way switching valve has a rocker arm 58 swingably provided in a lower portion of a main body case 51. When making a plunger 53 slide by making the shape-memory alloy wire 57 contract/expand, this device swings the rocker arm 58 to switch the valve according to the swing of the rocker arm 58. Lead wires 55 are connected to the two end portions of the shape-memory alloy wire 57 via terminal portions so as to protrude outside the main body case 51.

The plunger 53 is disposed in a storage room 50 of the main body case 51 so as to be vertically slidable. The rocker arm 58 is disposed below the plunger 53 so as to be vertically swingable about a swing shaft 58b. A valve chamber 63 is provided in a base portion 52 fixed to a lower portion of the main body case 51. A common port 62 is formed in a middle portion of the base portion 52 of the valve chamber 63. A first port 60 and a second port 61 are formed on the left and right sides of the common port 62.

Valve seat portions 60a and 61a are provided on the upper opening edges of the first and second ports 60 and 61.

As shown in FIG. 14, the rocker arm 58 is supported to be laterally pivotal about swing shaft 58b in the horizontal direction. A convex portion 58a protrudes from an upper left portion of the rocker arm 58. The convex portion 58a comes into contact with a lower portion of the plunger 53. A diaphragm valve 56 is attached to a portion below the rocker arm 58. The diaphragm valve 56 closes the first port 60 by bringing a left lower surface of the diaphragm valve 56 into contact with the valve seat portion 60a of the first port 60 in accordance with the swinging movement of the rocker arm 58. When the rocker arm 58 swings inversely, the diaphragm valve 56 closes the second port 61 by bringing a right lower surface of the diaphragm valve 56 into contact with the valve seat portion 61a of the second port 61. A spring member 59 is provided in the main body case 51 located at the upper right of the rocker arm 58 so as to always bias a right portion of the rocker arm 58 downward.

Preheating control similar to the method described above is executed on the three-way switching valve using the shape-memory alloy wire 57 shown in FIGS. 14 and 15 at the time of preheating.

Figure 11:
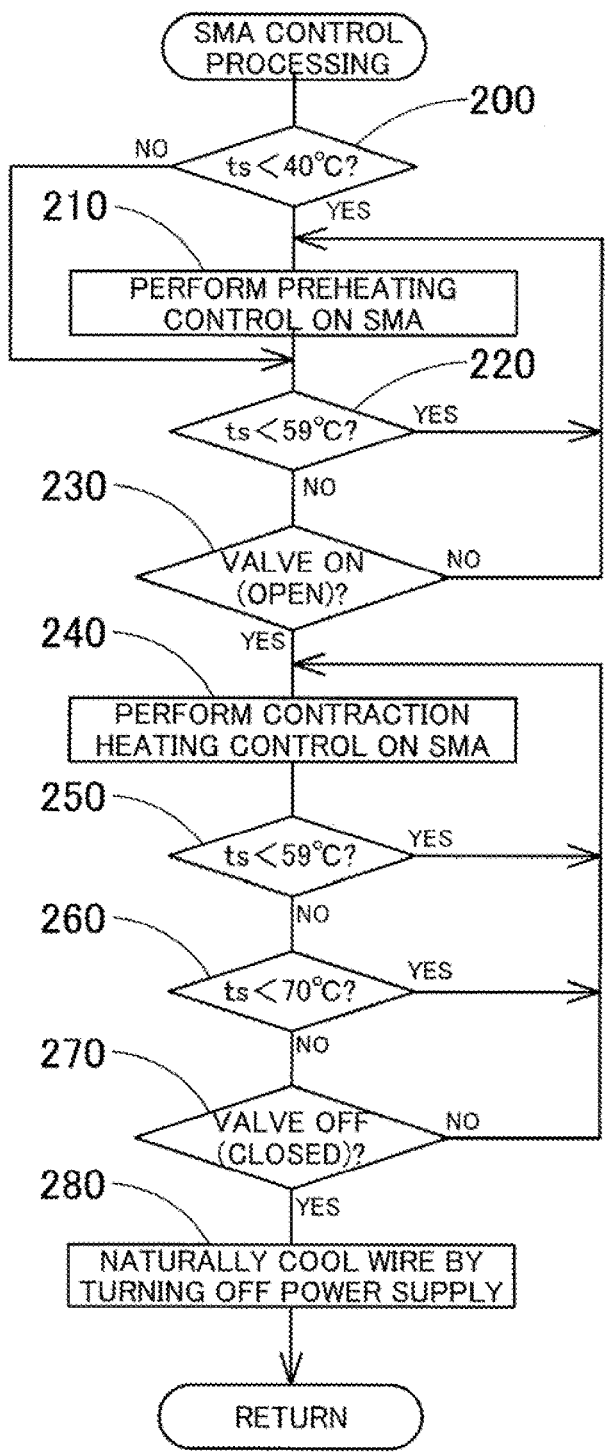
FIG. 11 is a flowchart showing schematic control processing of the shape-memory alloy valve device.

That is, as indicated by the block diagram of FIG. 9, the flowchart of FIG. 11, and the pulse voltage waveform graph of FIG. 12, when a power circuit 40 of the valve device is turned on, a microcomputer 41 and a switching circuit 42 operate to supply the pulse current having the pulse voltage waveform shown in FIG. 12 to the shape-memory alloy wire 57. This starts preheating the shape-memory alloy wire 57 in accordance with the temperature of the wire.

At the time of preheating, as shown in FIG. 12, a pulse voltage (current) energizing the shape-memory alloy wire 57 is subjected to current value PWM control (pulse width control) in accordance with a temperature ts of the wire as follows. When the temperature ts of the wire is lower than a preset preheat set temperature Ts, the pulse width (energization period) is increased to a value corresponding to the preheat set temperature Ts (for example, 54° C.), thereby raising the temperature ts of the wire. That is, as schematically indicated by steps 200 and 210 in FIG. 11, steps 200 and 210 are repeated to perform preheating control on the shape-memory alloy wire 57.

At the time of preheating, a pulse period for PWM control is set to period t0 (for example, several ten msec), and a pulse voltage (current) in each period rises at times t1, t2, t3, . . . , as shown in FIG. 12. Temperature measurement timing St is set at a short time tss (for example, several msec) after each of leading edge timings t1, t2, t3, . . . . A voltage detection signal from the shape-memory alloy wire 57 is input to the microcomputer 41 at temperature measurement timing St in each pulse period, and the temperature ts of the wire is calculated from the voltage signal in each pulse period.

The microcomputer 41 repeatedly and consecutively calculates the temperature ts of the wire in a short time. When the calculated temperature ts of the shape-memory alloy wire 57 is lower than preset preheat set temperature Ts, energization of the shape-memory alloy wire 57 is continued, and energization with a pulse period is turned off when the temperature ts of the wire reaches the preheat set temperature Ts, as shown in FIG. 12. In contrast to this, when the temperature ts of the wire is higher than preheat set temperature Ts, energization is immediately turned off. With this operation, as shown in FIG. 12, the pulse width of a current to the shape-memory alloy wire 57 is controlled to control a current value, thereby maintaining the temperature ts of the wire at the preset preheat set temperature Ts.

At the time of a switching operation of the three-way switching valve, when the shape-memory alloy wire 57 contracts, as shown in FIG. 15, the plunger 53 slides upward, a left portion of the rocker arm 58 pivots upward via the convex portion 58a, a right portion of the rocker arm 58 pivots relatively downward, and the diaphragm valve 56 swings in the same manner. This causes the first port 60 on the left to open the valve and causes the second port 61 on the right to close the valve. That is, the diaphragm valve 56 operates such that the first port 60 and the second port 61 perform opening/closing operations. This switching operation causes the first port 60 to communicate with a common port 62.

In contrast to the above operation, when energization of the shape-memory alloy wire 57 is stopped to perform valve closing control, the shape-memory alloy wire 57 expands, and the plunger 53 moves downward due to the biasing force of a spring member 54. With this operation, a lower portion of the plunger 53 pushes the convex portion 58a of the rocker arm 58 downward, and a left portion of the rocker arm 58 pivots downward, and the diaphragm valve 56 swings in the same manner, as shown in FIG. 14. This switching operation causes the first port 60 on the left to close the valve, and second port 61 to open the valve, thereby making the second port 61 communicate with the common port 62.

Each of the shape-memory alloy valve devices according to the above embodiments is structured such that when the shape-memory alloy wire 7 or 57 contracts, the plunger 3 or 53 slides to open/close the valve or perform valve switching. However, each shape-memory alloy valve device can also be structured to operate the valve by making the shape-memory alloy wire contract without using any plunger.

Figures 16, 17:
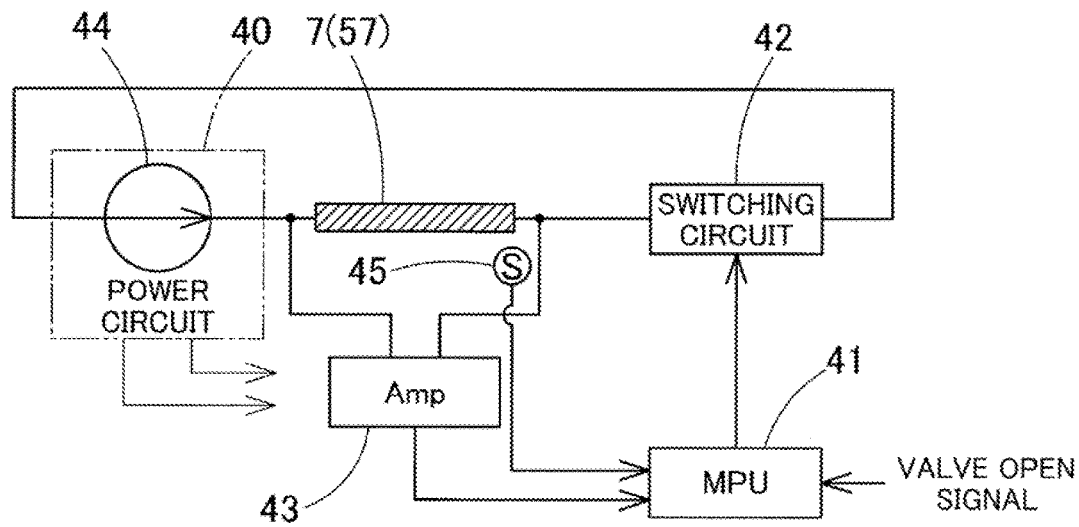
FIG. 17 is a view for explaining a data table for preheating control.

FIG. 16 shows a control circuit according to another embodiment. In this control circuit, a temperature sensor 45 is disposed near a shape-memory alloy wire 7 in a main body case 1 to detect the temperature of a shape-memory alloy wire 7 (57). The temperature sensor 45 detects the temperature of the shape-memory alloy wire 7, and outputs a detection signal to a microcomputer 41.

In this case, the concept of being near the shape-memory alloy wire 7 (57) includes being located near the wire at a certain distance from it and being in contact with the wire. The temperature sensor 45 may detect a temperature in the main body case or the temperature of the wire itself. Note that the temperature sensor 45 can also be located outside the main body case.

Preheating control on the shape-memory alloy valve device is performed by using the above temperature sensor 45 as follows. As shown in FIG. 17, actuation voltages/current values, actuation times, and holding voltages/current values for preheating are stored, in advance, as table data in a memory in the microcomputer 41 in correspondence with temperatures ts of the wire. The microcomputer 41 preheats the wire while controlling an actuation voltage and current value, actuation time, holding voltage/current value to be supplied to the shape-memory alloy wire 7 on the basis of values read out from the memory in accordance with the detected temperature ts of the wire.

When, for example, the temperature of the shape-memory alloy wire 7 (the temperature in the main body case), detected by the temperature sensor 45, is −10° C., the microcomputer 41 refers to the data table in the memory to read out a corresponding voltage and current value, and applies a voltage of 5.1 v and a current value of 350 mA to the wire for an actuation time of 0.22 sec with a predetermined pulse period, as shown in, for example, FIG. 17. When this quickly raises the temperature ts of the shape-memory alloy wire 7 to the preheat set temperature Ts, the microcomputer 41 switches the voltage and current value to an actuation holding voltage and current, and applies a lower voltage of 2.4 v and a current of 220 mA to the wire for an actuation time of 0.22 sec with a predetermined pulse period, thereby holding the preheated state of the wire.

Assume that a room temperature is low in a cold area or the like and the temperature of the shape-memory alloy wire 7 is much lower than the actuation temperature. Even in this case, with the above operation, the power circuit is turned on to quickly raise the temperature ts of the wire, and the applied voltage and current are switched to an actuation holding voltage and current to hold the temperature when the temperature ts reaches the preheat set temperature Ts. This makes it possible to improve the response speed of a valve opening or valve closing operation at the time of valve opening/closing while preventing the shape-memory alloy wire 7 from being excessively heated.

Figure 18:
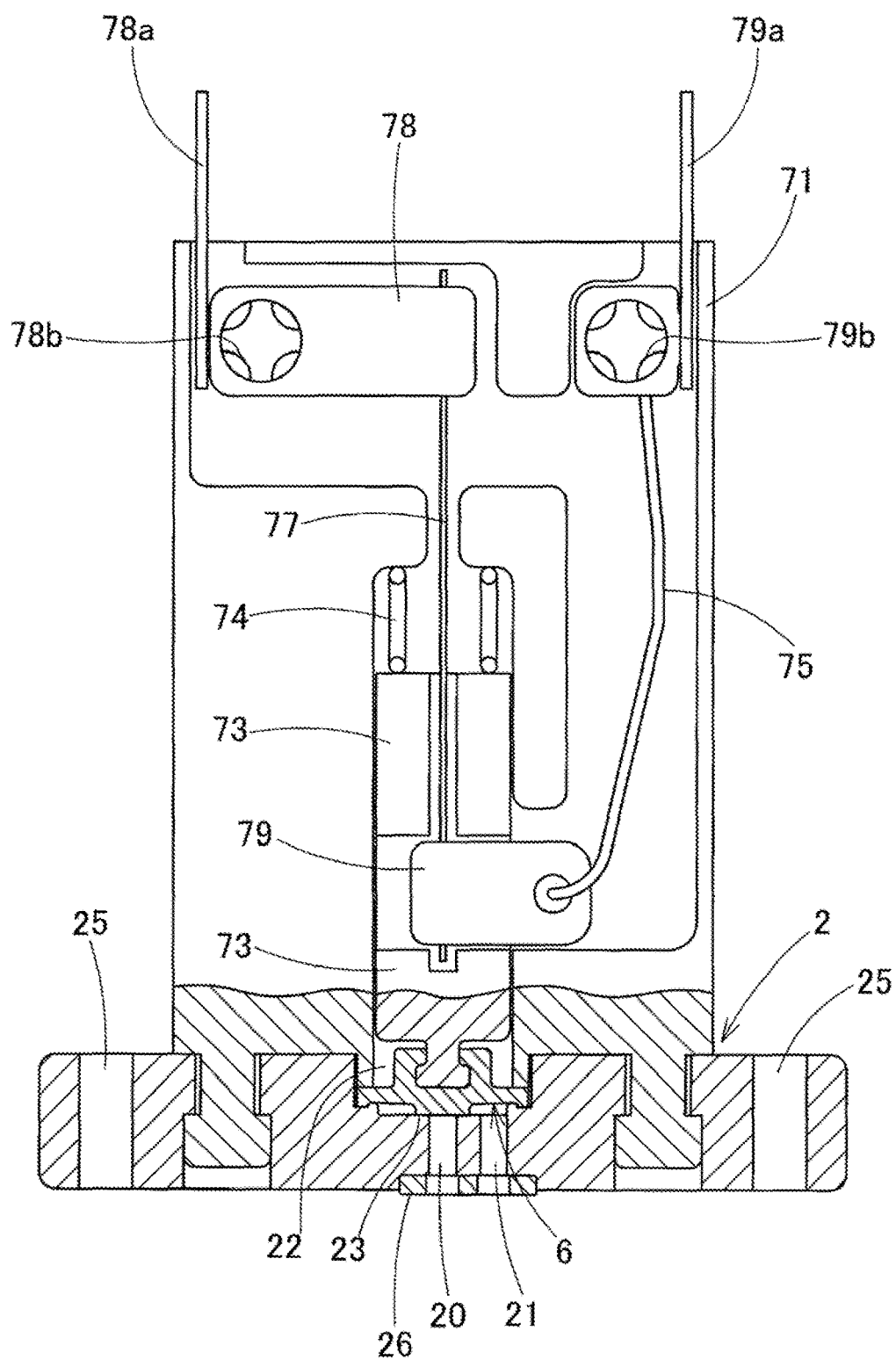
FIG. 18 is a block diagram showing the arrangement of a control circuit according to another embodiment.
Figure 19:
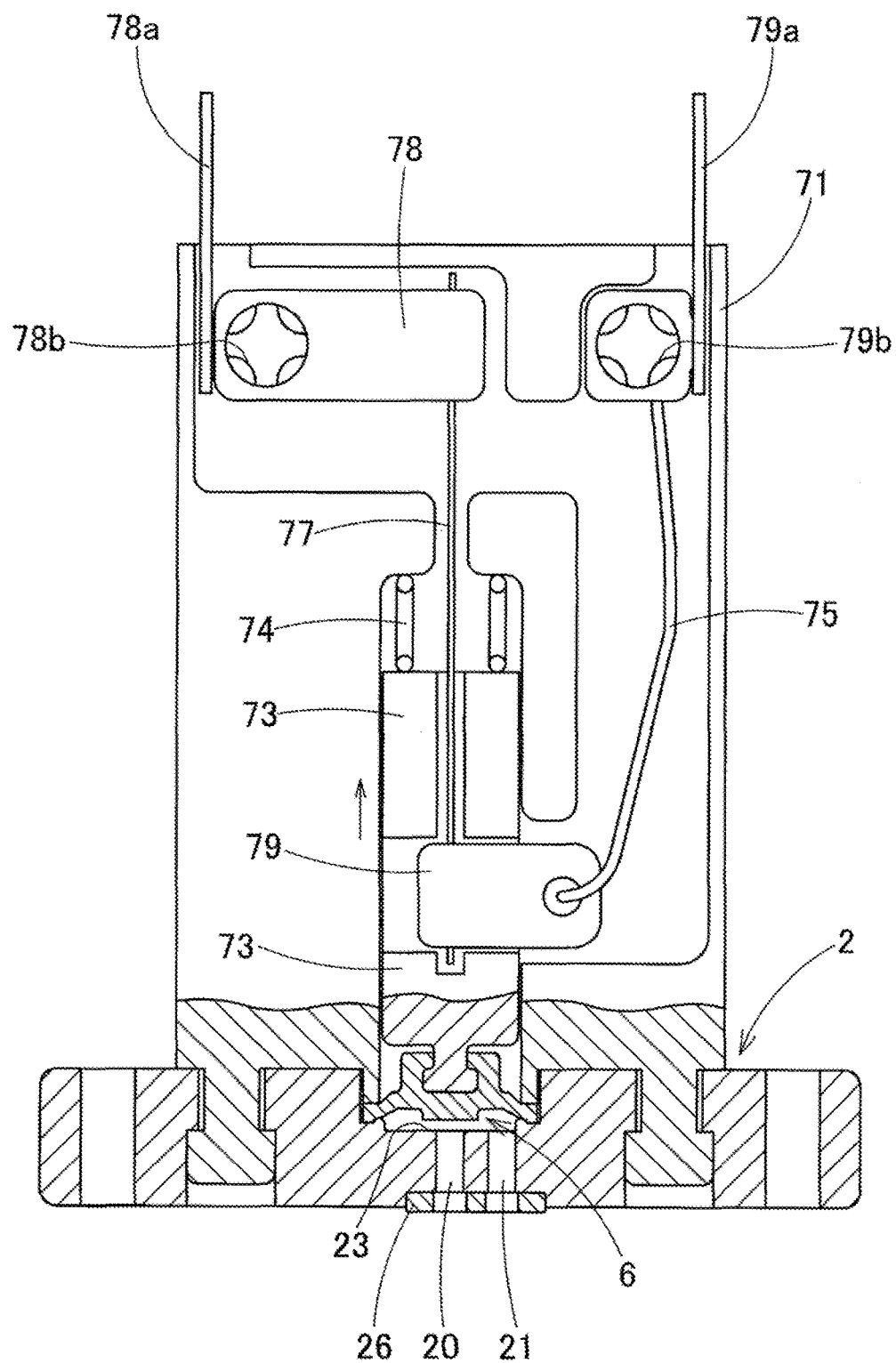
FIG. 19 is a sectional view of the shape-memory alloy valve device according to the fourth embodiment at the time of actuation.

FIGS. 18 and 19 show a shape-memory alloy valve device according to the fourth embodiment. As shown in FIGS. 18 and 19, this shape-memory alloy valve device has one shape-memory alloy wire 77 vertically linearly disposed and a movable terminal member 79 on the lower side attached to a plunger 73. Note that the same reference numerals as in FIGS. 18 and 19 denote the same components as those in the above embodiments, and a description of the components will be omitted.

In this shape-memory alloy valve device, an axial hole is formed at the axial position of the plunger 73, and the single linear shape-memory alloy wire 77 is vertically inserted through the axial hole. The upper end of the linear shape-memory alloy wire 77 is fixed to a terminal member 78 on the stationary side which is attached to an upper portion of a main body case 71. The lower end of the shape-memory alloy wire 77 is fixed to a movable terminal member 79 attached to the plunger 73.

The plunger 73 is vertically slidably held in the main body case 71 in the same manner as described above, and a spring member 74 is provided in an upper inside portion so as to bias the plunger 73 downward toward the valve closing side. With the biasing force of the spring member 74, a valving element 6 attached to the lower end of the plunger 73 is seated on a valve seat portion 23 at the descending end to close the valve.

Connector terminals 78a and 79a protrude upward from upper portions of the main body case 71. The terminal member 78 on the stationary side is fixed with a fixing portion 78b connected to the connector terminal 78a. The movable terminal member 79 is attached to the plunger 73 that vertically slides. The movable terminal member 79 is connected to a fixing portion 79b of a connector terminal 79a via a lead wire 75. The connector terminal 79a protruding upward is fixed to an upper portion of the main body case 71 with the fixing portion 79b.

The valve device using the shape-memory alloy wire 77 shown in FIGS. 18 and 19 is also configured to execute preheating control in the same manner as described above at the time of preheating.

That is, when a power circuit 40 of the valve device is turned on, a microcomputer 41 and a switching circuit 42 operate to supply a pulse current corresponding to the pulse voltage waveform shown in FIG. 12 to the shape-memory alloy wire 77, thereby starting to preheat the shape-memory alloy wire 77 in accordance with the temperature of the wire.

At the time of preheating, as shown in FIG. 12, a pulse voltage (current) energizing the shape-memory alloy wire 77 is subjected to current value PWM control (pulse width control) in accordance with a temperature ts of the wire as follows. When the temperature ts of the wire is lower than a preset preheat set temperature Ts, the pulse width (energization period) is increased to a value corresponding to the preheat set temperature Ts (for example, 54° C.), thereby raising the temperature ts of the wire. That is, as schematically indicated by steps 200 and 210 in FIG. 11, steps 200 and 210 are repeated to perform preheating control on the shape-memory alloy wire 77.

At the time of preheating, a pulse period for PWM control is set to period t0 (for example, several ten msec), and a pulse voltage in each period rises at times t1, t2, t3, . . . , as shown in FIG. 12. Temperature measurement timing St is set at a short time tss (for example, several msec) after each of leading edge timings t1, t2, t3, . . . . A voltage detection signal from the shape-memory alloy wire 77 is input to the microcomputer 41 at temperature measurement timing St in each pulse period, and the temperature ts of the wire is calculated from the voltage signal in each pulse period.

The microcomputer 41 repeatedly and consecutively calculates the temperature ts of the wire in a short time. When the calculated temperature ts of the shape-memory alloy wire 77 is lower than the preset preheat set temperature Ts, energization of the shape-memory alloy wire 77 is continued, whereas when the temperature ts of the wire reaches the preheat set temperature Ts, energization in the corresponding pulse period is turned off, as shown in FIG. 12. In contrast to this, when the temperature ts of the wire is higher than preheat set temperature Ts, energization is immediately turned off. With this operation, as shown in FIG. 12, the pulse width of a current to the shape-memory alloy wire 77 is controlled to control a current value, thereby maintaining the temperature ts of the wire at the preset preheat set temperature Ts.

When the shape-memory alloy wire 77 contracts at the time of the valve opening operation of the valve device, the plunger 73 slides upward against the biasing force of the spring member 74, as shown in FIG. 19, and the valving element 6 separates from the valve seat portion 23, thereby causing the valve device to open the valve.

When the energization of the shape-memory alloy wire 77 is stopped and valve closing control is performed, the shape-memory alloy wire 77 expands, and the plunger 73 moves downward with the biasing force of the spring member 74. The valving element 6 is then seated on the valve seat portion 23, thereby closing the valve, as shown in FIG. 18.

Figure 20:
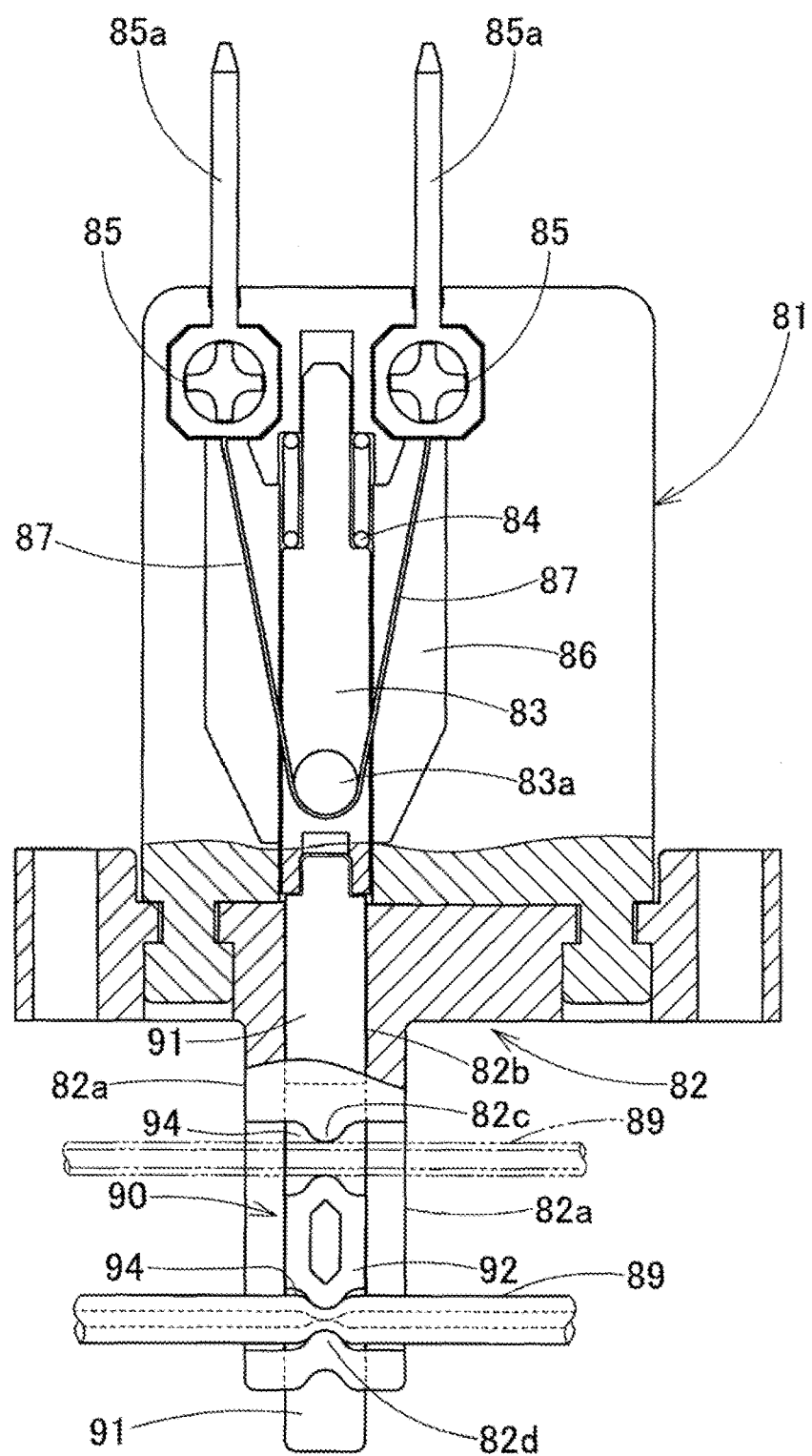
FIG. 20 is a sectional view of a shape-memory alloy valve device according to the fifth embodiment.
Figure 21:
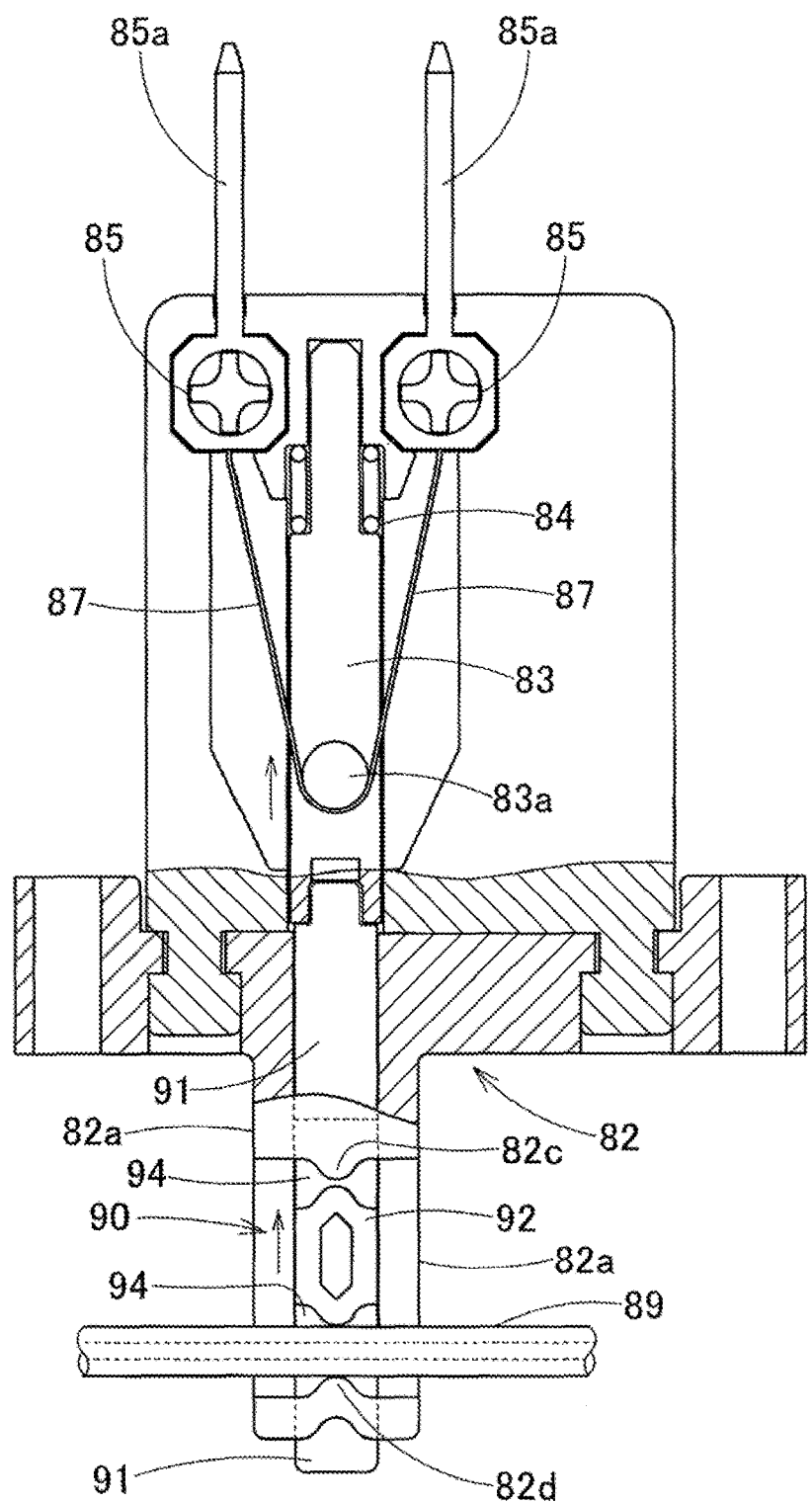
FIG. 21 is a sectional view of the shape-memory alloy valve device according to the fifth embodiment at the time of actuation.

FIGS. 20 and 21 show a shape-memory alloy valve device according to the fifth embodiment. As shown in FIGS. 20 and 21, this shape-memory alloy valve device is constituted as a pinch valve device structured to close the valve by collapsing a tube 89 forming a fluid path in accordance with the movement of a valve member 90 accompanying contraction/expansion of a shape-memory alloy wire 87. This valve device includes a main body case 81 internally provided with a storage room 86, a plunger 83 vertically slidably disposed in the storage room 86, a valve member main body 91 of the valve member 90 which is attached to the lower end portion of the plunger 83, a base portion 82 fitted in the base of the main body case 81, and the shape-memory alloy wire 87 that contracts to make the plunger 83 slide at the time of energization.

In the storage room 86 of the main body case 81, a spring member 84 that is attached to the plunger 83 and biases the plunger 83 in a valve closing direction is fitted on an upper portion of the plunger 83, and the valve member 90 is coupled to a lower end portion of the plunger 83. The base portion 82 is attached to the base of the main body case 81 by fitting a rectangular fitting convex portion in a fitting hole.

As shown in FIGS. 20 and 21, an elongated valve member holding portion 82a protrudes downward from the base portion 82 fixed to a lower portion of the main body case 81, and a sliding hole 82b is provided in the valve member holding portion 82a. The valve member main body 91 of the valve member 90 is vertically slidably inserted in the sliding hole 82b. The storage room 86 in the main body case 81 vertically communicates with the sliding hole 82b, and the lower end portion of the plunger 83 is coupled to the upper end portion of the valve member main body 91 at a communicating portion.

As shown in FIGS. 20 and 21, the valve member 90 is constituted by a valve member movable portion 92 provided on a middle portion of the valve member main body 91, a valve member upper fixed portion 82c provided on an upper portion of the valve member holding portion 82a, and a valve member lower fixed portion 82d provided on a lower portion of the valve member holding portion 82a. Upper and lower portions of the valve member movable portion 92 are provided with pinch convex portions, and insertion spaces 94 for the insertion of the tube 89 are formed above and below the valve member movable portion 92. The valve member 90 holds tube 89 serving as a fluid path between the valve member upper fixed portion 82c and the valve member movable portion 92 or between the valve member movable portion 92 and valve member lower fixed portion 82d. The valve member 90 collapses the tube 89 to close the valve, and restores the tube 89 to open the valve.

Note that as indicated by the imaginary lines in FIG. 20, when the tube 89 is inserted into the insertion space 94 between the valve member upper fixed portion 82c and the valve member movable portion 92, the tube 89 is collapsed to close the valve when the shape-memory alloy wire 87 contracts upon the upward movement of the valve member movable portion 92, whereas the tube 89 is restored to open the valve when the tube shape-memory alloy wire 87 expands upon the downward movement of the valve member movable portion 92.

Connector terminals 85a of a pair of terminal members 85 protrude upward from upper portions of the main body case 81. The terminal members 85 are fixed in the main body case 81 with fixing portions, and the two end portions of the shape-memory alloy wire 87 are fixed to the fixing portions. A middle portion of the shape-memory alloy wire 87 is hooked on a wire hooking portion 83a provided on a lower portion of the plunger 83, and the shape-memory alloy wire 87 in a U-shape receives the downward biasing force of the spring member 84 to be held in an expansion state.

In this embodiment, because the plunger 83 and the valve member movable portion 92 of the valve member 90 are always biased downward with the biasing force of the spring member 84, when the tube 89 is inserted between the valve member movable portion 92 and the valve member lower fixed portion 82d, a valve closed state is set, thereby implementing a normal close valve device. On the other hand, when the tube 89 is inserted between the valve member movable portion 92 and the valve member upper fixed portion 82c, a valve open state is usually set, thereby implementing a normal open valve device.

The pinch valve device using the shape-memory alloy wire 87 shown in FIGS. 20 and 21 is also configured to execute preheating control in the same manner as described above at the time of preheating.

That is, when a power circuit 40 of the valve device is turned on, a microcomputer 41 and a switching circuit 42 operate to supply a pulse current corresponding to the pulse voltage waveform shown in FIG. 12 to the shape-memory alloy wire 87, thereby starting to preheat the shape-memory alloy wire 87 in accordance with the temperature of the wire.

At the time of preheating, as shown in FIG. 12, a pulse voltage (current) energizing the shape-memory alloy wire 87 is subjected to current value PWM control (pulse width control) in accordance with a temperature ts of the wire as follows. When the temperature ts of the wire is lower than a preset preheat set temperature Ts, the pulse width (energization period) is increased to a value corresponding to the preheat set temperature Ts (for example, 54° C.), thereby raising the temperature ts of the wire. That is, as schematically indicated by steps 200 and 210 in FIG. 11, steps 200 and 210 are repeated to perform preheating control on the shape-memory alloy wire 87.

At the time of preheating, the pulse voltage waveform of a supplied current is set to pulse period t0 (for example, several ten msec), and a pulse voltage (current) with each period rises at times t1, t2, t3, . . . , as shown in FIG. 12. Temperature measurement timing St is set at a short time tss (for example, several msec) after each of leading edge timings t1, t2, t3, . . . . A voltage detection signal from the shape-memory alloy wire 87 is input to the microcomputer 41 at temperature measurement timing St in each pulse period, and the temperature ts of the wire is calculated from the voltage signal in each pulse period.

The microcomputer 41 repeatedly and consecutively calculates the temperature ts in a short time. When the calculated temperature ts of the shape-memory alloy wire 87 is lower than the preset preheat set temperature Ts, energization of the shape-memory alloy wire 87 is continued, whereas when the temperature ts of the wire reaches the preheat set temperature Ts, energization in the corresponding pulse period is turned off, as shown in FIG. 12. In contrast to this, when the temperature ts of the wire is higher than preheat set temperature Ts, energization is immediately turned off. With this operation, the current to the shape-memory alloy wire 87 is PWM controlled, thereby maintaining the temperature ts of the wire at the preset preheat set temperature Ts.

When the shape-memory alloy wire 87 contracts at the time of the valve opening operation of the valve device, the plunger 83 slides upward against the biasing force of the spring member 84, as shown in FIG. 21, and the valve member movable portion 92 of the valve member 90 separates from the tube 89, thereby causing the valve device to open the valve.

When the energization of the shape-memory alloy wire 87 is stopped and valve closing control is performed, the shape-memory alloy wire 87 expands, and the plunger 83 moves downward with the biasing force of the spring member 84. This makes the valve member main body 91 move downward and makes the valve member movable portion 92 move downward to collapse the tube 89 between the valve member movable portion 92 and the valve member lower fixed portion 82d, thus causing the valve device to close the valve, as shown in FIG. 20.

What is claimed is:

1. A shape-memory alloy valve device comprising:
a valve member;
a shape-memory alloy wire configured to make the valve member perform an opening/closing operation;

a valve actuation control unit configured to control an opening/closing operation of the valve member by controlling energization of the shape-memory alloy wire in accordance with an input valve open signal or an input valve close signal so as to make the shape-memory alloy wire contract by raising a temperature of the shape-memory alloy wire beyond an operating environmental temperature;

a temperature measurement unit configured to measure a temperature of the shape-memory alloy wire; and a preheating unit configured to heat the shape-memory alloy wire to a preset preheat set temperature by energizing the shape-memory alloy wire from a power circuit when a temperature of the shape-memory alloy wire which is measured by the temperature measurement unit is lower than the preheat set temperature.

2. The device according to claim 1, wherein the temperature measurement unit detects a voltage of the shape-memory alloy wire at predetermined time intervals accompanying energization of the shape-memory alloy wire, calculates a resistance value from the voltage, and calculates a temperature of the shape-memory alloy wire from the resistance value.

3. The device according to claim 1, wherein a temperature sensor as the temperature measurement unit is disposed near the shape-memory alloy wire to measure a temperature of the shape-memory alloy wire, based on a detection signal from the temperature sensor, when preheating is performed.

4. The device according to claim 1, wherein the power circuit is provided with a constant current source, and the valve actuation control unit converts a current supplied from the constant current source into pulses by switching at a predetermined frequency and controls a current value of the shape-memory alloy wire by changing a duty ratio of the pulses.

5. The device according to claim 1, wherein a diaphragm valve as the valve member is attached to a plunger that slides by contraction of the shape-memory alloy wire.

6. The device according to claim 1, wherein the valve member is fixed to a distal end of a valve connecting portion of a plunger that slides by contraction of the shape-memory alloy wire, and a bellows is attached to the plunger so as to cover the valve member and the valve connecting portion.

7. The device according to claim 1, further comprising a plunger that slides by contraction of the shape-memory alloy wire and a rocker arm that is made to swing by the plunger,
wherein a diaphragm valve is attached as the valve member to the rocker arm, and the diaphragm valve makes a first port and a second port perform an opening/closing operation.

8. The device according to claim 5, wherein two ends of the shape-memory alloy wire are fixed to terminal members, and a middle portion of the shape-memory alloy wire is hooked in a substantially U-shape on a wire hooking portion provided on the plunger.

9. The device according to claim 5, wherein one end of the shape-memory alloy wire is fixed to a terminal member on a stationary side, and the other end of the shape-memory alloy wire is linearly attached to a movable terminal member.

10. The device according to claim 1, wherein the valve member comprises a valve member holding portion provided with a valve member fixed portion and a valve member movable portion movably held by the valve member holding portion, a tube is inserted into an insertion space provided between the valve member fixed portion and the valve member movable portion, the valve member movable portion of the valve member moves by contraction of the shape-memory alloy wire, the valve member collapses the tube between the valve member movable portion and the valve member fixed portion to perform a valve closing operation, and the valve member restores the collapsed tube to perform a valve opening operation.

* * * * *